US00RE38557E1

(19) United States
(12) Reissued Patent
Englund et al.

(10) Patent Number: US RE38,557 E
(45) Date of Reissued Patent: Jul. 20, 2004

(54) NON-CONTAMINATING PRESSURE TRANSDUCER MODULE

(75) Inventors: Diane L. Englund, Minneapolis, MN (US); Gerald R. Cucci, Minneapolis, MN (US)

(73) Assignee: NT International, Inc., Fridley, MN (US)

( * ) Notice: This patent is subject to a terminal disclaimer.

(21) Appl. No.: 09/502,736

(22) Filed: Feb. 11, 2000

Related U.S. Patent Documents

Reissue of:
(64) Patent No.: 5,869,766
Issued: Feb. 9, 1999
Appl. No.: 08/980,902
Filed: Dec. 1, 1997

U.S. Applications:
(63) Continuation-in-part of application No. 08/538,478, filed on Oct. 3, 1995, now Pat. No. 5,693,887.

(51) Int. Cl.[7] ..... G01L 7/08; G01L 9/00
(52) U.S. Cl. ..... 73/706; 73/715; 73/756
(58) Field of Search ..... 73/706, 708, 715, 73/723, 724, 756; 361/283.4; 338/4, 42

(56) References Cited

U.S. PATENT DOCUMENTS

| | | | | |
|---|---|---|---|---|
| 2,190,713 | A | 2/1940 | Hintze et al. | |
| 2,734,526 | A | 2/1956 | Aagaard | 137/486 |
| 3,645,139 | A | 2/1972 | Zavoda | |
| 3,930,823 | A | 1/1976 | Kurtz et al. | |
| 4,010,769 | A | 3/1977 | De Lorenzo et al. | |
| 4,127,840 | A | 11/1978 | House | |
| 4,177,496 | A | 12/1979 | Bell et al. | |
| 4,192,192 | A | 3/1980 | Schnell | |
| 4,252,510 | A | 2/1981 | Bromley | 417/534 |
| 4,322,980 | A | 4/1982 | Suzuki et al. | |
| 4,343,456 | A | 8/1982 | Zitzloff | |
| 4,461,181 | A | 7/1984 | North | |
| 4,507,973 | A | 4/1985 | Barr et al. | |

(List continued on next page.)

FOREIGN PATENT DOCUMENTS

| | | |
|---|---|---|
| JP | 05-033044 U | 2/1993 |
| JP | 06-129927 | 5/1994 |
| JP | 6-129927 | 5/1994 |
| JP | 07-072029 A | 6/1994 |
| JP | 07072029 | 3/1995 |
| JP | 08313379 A | 5/1995 |
| JP | 08-313379 | 5/1995 |
| JP | 2552093 | 11/1996 |

OTHER PUBLICATIONS

Published Article: *An isolation chamber for pressure measurement of corrosive atmosphere,* S. Meiri, Northwestern University, 1976 no month.

*Primary Examiner*—William Oen
(74) *Attorney, Agent, or Firm*—Patterson, Thuente, Skaar & Christensen, P.A.

(57) ABSTRACT

A non-contaminating pressure transducer module having an isolation member is disclosed. The isolation member isolates a pressure sensor within the transducer module from exposure to ultra high purity fluids flowing through a conduit in the module without significantly affecting the accuracy of the pressure measurement. The transducer module may be positioned within a fluid flow circuit carrying corrosive materials, wherein the pressure transducer module produces a control signal proportional to either a gauge pressure or an absolute pressure of the fluid flow circuit. The pressure transducer module of the present invention also avoids the introduction of particulate, unwanted ions, or vapors into the flow circuit.

49 Claims, 17 Drawing Sheets

U.S. PATENT DOCUMENTS 4,653,330 A 3/1987 Hedkke
4,683,755 A 8/1987 Samek
4,994,781 A 2/1991 Sahagen
5,063,784 A 11/1991 Ridenour
5,088,329 A 2/1992 Sahagen ..... 73/727
5,137,026 A 8/1992 Waterson et al. ..... 128/725
5,167,158 A 12/1992 Kamachi et al.
5,174,926 A 12/1992 Sahagen
5,183,078 A 2/1993 Sorrell
5,184,514 A 2/1993 Cucci et al. ..... 73/706
5,284,425 A 2/1994 Holtermann et al. ..... 417/395
5,287,851 A 2/1994 Beran et al. ..... 128/204.23
5,316,035 A 5/1994 Collins et al.
5,347,862 A 9/1994 Ingman ..... 73/269
5,357,792 A 10/1994 Getenby
5,410,916 A 5/1995 Cook
5,563,347 A 10/1996 Martin et al.
5,604,315 A 2/1997 Briefer et al.
5,653,191 A 8/1997 Calhoun et al.
5,654,512 A 8/1997 Harnett et al.
5,656,780 A 8/1997 Park
5,657,001 A 8/1997 Wilson
5,668,322 A 9/1997 Broden
5,693,887 A 12/1997 Englund et al.
5,822,173 A 10/1998 Dague et al.
5,878,000 A 3/1999 Dubois

NON-CONTAMINATING PRESSURE TRANSDUCER MODULE

Matter enclosed in heavy brackets [ ] appears in the original patent but forms no part of this reissue specification; matter printed in italics indicates the additions made by reissue.

The present application is a Continuation-In-Part of application Ser. No. 08/538,478 filed on Oct. 3, 1995, now U.S. Pat. No. 5,693,887, and entitled "PRESSURE TRANSDUCER MODULE HAVING NON-CONTAMINATING BODY AND ISOLATION MEMBER".

BACKGROUND OF THE INVENTION

I. Field of the Invention

This invention relates generally to non-contaminating pressure transducer modules, and more particularly relates to a pressure transducer module that effectively operates within Ultra High Purity (UHP) processing equipment that utilize UHP chemicals and require UHP conditions. The pressure transducer module of the present invention provides a continuous measurement of the pressure within a fluid flow circuit of the UHP processing equipment without contaminating the fluid within the circuit. An isolation member [which] isolates a pressure sensor from the chemically corrosive fluid flow. The pressure sensor adjoins the isolation member without compromising the accuracy of the pressure measurement or increasing the risk of fluid contamination. The isolation member may be interchangeable and eliminates the need to submerge the pressure sensor in an oil or other fluid, thereby eliminating potential contaminants to the fluid flow channel.

II. Discussion of the Related Art

Over the years, the processing equipment used during the manufacture of semiconductor substrates has evolved, attempting to isolate the substrate from the presence of any small particles, metallic ions, vapors or static discharge in the environment during the manufacturing process. The processing equipment may be used to manufacture, for example, a wafer, LCD, flat panel display, and/or memory disks. Significantly, industry standards require ultra high purity environments within the processing equipment.

During the processing of semiconductor substrates, the substrate is commonly subjected to chemically corrosive fluids and high temperatures. These fluids are delivered and removed from the substrate by the UHP processing equipment through fluid lines. The various components of the processing equipment are commonly designed to reduce the amount of particulate generated and to isolate the processing chemicals from contaminating influences. Typically, the processing equipment will include monitoring and sensing devices connected in a closed loop feedback which are used in monitoring and controlling the equipment. These monitoring and sensing devices must also be designed to eliminate any contamination which might be introduced and must operate with accuracy through a wide range of temperatures.

A highly corrosive environment may be created when aggressive processing chemicals are delivered to the processing equipment. Liquid transporting systems carry these chemicals from supply tanks through pumping and regulating stations and through the processing equipment itself The liquid chemical transport systems, which includes pipes, tubing, valves, and fittings, are frequently made of plastics resistant to the deteriorating effects of the aggressive processing chemicals. Of course, anything mechanical is subject to potential leakage and such leakage can create extremely hazardous conditions both to the processing of semiconductor wafers or other products and also to personnel who may have to tend and maintain the processing equipment. Hence, the chemical transport system must be designed to detect and avoid such leakage.

Monitoring and sensing devices are incorporated into the UHP processing equipment to detect, for example, this leakage. The monitoring and sensing devices may incorporate sensors which also must be designed to avoid the introduction of particulate, unwanted ions, or vapors into the processing steps. Monitoring the pressure within the chemical transport system is useful for several reasons. First, a change in pressure within the system may indicate leakage within the system. Second, the pressure within the transport system is regulated to avoid exceeding predetermined safety limits. Third, the pressure within a fluid flow circuit may be controlled to actuate various processing tools connected to the processing equipment.

When highly corrosive hazardous chemicals are used, such corrosive atmospheric environments are extremely hard on the monitoring and sensing equipment. Further, the monitoring and sensing equipment may transmit wafer damaging particulate, ions, or vapors as a result of exposure to the corrosive atmospheric environment. Metals, which are conventionally used in such monitoring devices, cannot reliably stand up to the corrosive environment for long periods of time. Hence, the monitoring and sensing devices must incorporate substitute materials. Significantly, a mere substitution of materials in the monitoring device oftentimes produces a device with other deficiencies, including leaks and inoperativeness. Although pressure sensors have generally been developed for use in other applications, these sensors are not particularly well suited for use in semiconductor substrate UHP processing equipment. Exemplary of such a fluid pressure sensor are the pressure gauges disclosed by Schnell in U.S. Pat. No. 4,192,192 and Zavoda in U.S. Pat. No. 3,645,139. The sensing portion of the pressure gauge of the '192 and '139 devices are contained within a housing that requires a cavity filled with a sensor fluid or oil. The cavity is formed adjacent the fluid flow and separated by a protective member. The protective member is described by Schnell '192 as being made from a metal having a TEFLON® coating being applied thereto. TEFLON® coatings are permeable and allow small amounts of fluid to permeate through the coating. When subjected to chemically corrosive fluids used in semiconductor substrate processing equipment, the processing fluids permeate through the coating of the protective member, corrode the metal and permeate back through the coating thereby contaminating the processing fluids. This contamination is not acceptable in UHP processing equipment. Further, it is believed that the stiffness of the metal coated '192 protective member decreases the accuracy and resolution of the measured pressure. Hence, use of the sensors disclosed in the '192 and '139 patents are not acceptable in the UHP processing equipment.

The protective member of the Zavoda '139 device is described as a TEFLON® molded single-unitary structure having a wavelike cross-section to enhance the flexibility and displacement characteristics of the diaphragm. TEFLON® films and molded parts are also permeable and allow small amounts of fluid to permeate through the part. Thus, when positioned in-line within the fluid flow circuit of semiconductor substrate processing equipment, the sensor fluid or oil contained within the housing of Zavoda would permeate through the protective member and contaminate the fluid within the fluid flow circuit. Also, a diaphragm having a wavelike cross-section as described by Zavoda '139 is believed to decrease the accuracy of pressure measurements when measured over a wide range of temperatures. Significantly, Zavoda does not describe a diaphragm that adjoins an enclosed sensor. Further, it is believed that adjoining the sensor to the diaphragm disclosed by Zavoda would result in an inoperable or unreliable pressure sensor having minimal accuracy and resolution. Hence, there is a need for a chemically inert pressure sensor module that isolates the sensor from the fluid flow without affecting the accuracy of the pressure measurements or requiring sensor fluid.

A device in accordance with the teachings of either the '192 or '139 patent includes additional shortcomings when used in semiconductor substrate processing equipment. The fluid contained within a cavity of the pressure gauge of these devices is typically a silicone oil. A change in pressure within the fluid flow of the processing equipment affects the oil pressure within the cavity of these devices. Also, the oil within the cavity typically has large thermal expansions which cause large deflection changes in the protective member. The large deflection changes in the protective member increases the likelihood that the oil within the cavity will leak into the fluid flow, contaminating the flow circuit of the processing equipment. Also, the accuracy of the pressure gauge is negatively affected by the large thermal expansions of the oil. Hence, a need exists for an in-line pressure gauge that does not leak contaminating fluids into or out of the fluid flow circuit. Also, a need exists for an in-line pressure sensor, wherein the accuracy is not affected by thermo changes within the fluid flow circuit.

Other devices have been described for measuring a pressure within a fluid flow circuit. For example, Ridenour in U.S. Pat. No. 5,063,784 and Sorrell in U.S. Pat. No. 5,183,078 describe devices that may be connected in-line within a fluid flow circuit to measure the pressure therein. Each device includes a check valve which functions as a barrier between the fluid flow circuit and a remote pressure sensor. When the valve is opened, fluid from the circuit flows through the valve and a certain amount of contaminating back flow results. Thus, the devices disclosed by Sorrell and Zavoda are not suitable for use in environments where high purity is desired.

Collins et al., in U.S. Pat. No. 5,316,035 (the '035 patent) describes a device that appears suitable for use in highly corrosive environments where high purity is desired. Collins describes a capacitance proximity monitoring device that detects the presence of liquids in the environment. The capacitance proximity device determines the change of electrical characteristics within a predetermined area as various fluids flow past the predetermined area. The changes in current from the sensing field is utilized to detect the presence of liquids within the sensing field. Although utilizable in high purity environments, the '035 patent does not describe a device capable of measuring pressure within a fluid flow conduit of the processing equipment.

Therefore, a need exists for a non-contaminating pressure transducer which may be positioned within a fluid flow circuit carrying corrosive materials, wherein the pressure transducer determines either a gauge pressure or absolute pressure of the fluid flow circuit with a reliable resolution and accuracy. A need also exists for a pressure transducer that avoids the introduction of particulate, unwanted ions, or vapors into the flow circuit. The present invention overcomes these and other disadvantages of the related art.

SUMMARY OF THE INVENTION

The purpose of the present invention is to provide a pressure transducer module that effectively operates within a fluid flow circuit of UHP processing equipment over a wide range of temperatures with minimal affects on the accuracy and resolution of the pressure measurement without requiring sensor fluids. The pressure transducer module of the present invention may be coupled to a flow circuit of corrosive fluid, wherein either the gauge pressure or absolute pressure within the flow circuit is determined.

The various embodiments of the pressure transducer module include a pressure sensor that is both contained within a non-contaminating body and isolated from the fluid flow. In the preferred embodiment, the components of the pressure transducer module include a chemically inert housing, a cap, an integrated circuit, an isolation member or planar disc, a pressure sensor, and sealing members. The cap of the housing is removably attached to the housing. The cap or cover may include mating threads formed on an internal surface of the cover and on the external surface of the housing. An electrical connector may be mounted into the cover and electrically coupled to the integrated circuit, providing an efficient electrical connection between the integrated circuit and external connector.

The isolation member and pressure sensor are retained within the cavity by a combination of spacer and hold down rings. The hold down ring may have threading formed on its surface that mates with threading formed on the internal surface of the valve body defining the cavity. As will be described in greater detail below, the spacer ring transfers a force from the hold down ring against the isolation member and housing to seal the isolation member to the housing. In addition, an external ring with a low coefficient of expansion may be engaged against an external surface of the housing to reduce expansion of the housing proximate the points of contact between the isolation member or planar disc and the housing.

The housing, isolation member, sealing members, spacer ring, and hold down ring are preferably constructed of the same polymer to avoid leakage when the transducer is subject to thermal expansion. Without any limitation intended, chemically inert polymers of suitable known construction including fully fluorinated fluorocarbon polymers (including peifluoroalkoxy (PFA), polytetrafluoroethylene (PTFE), and fluorinated ethylene propylene (FEP)), partially fluorinated fluorocarbon polymers (including ethylene tetrafluoroethylene (ETFE), polychlorotrifluoroethylene (CTFE), ethylene-chlorotrofluoroethylene (ECTFE), and polyvinylidine fluoride (PVDF)), high performance engineering thermoplastics (including polyetheretherketone (PEEK)) and elastomeric perfluorocarbons (including elastomeric polytetrafluoroethylene) may be used, with PFA being preferred. These polymers reduce the amount of abraded particulate, are chemically inert, and provide a non-contaminating pressure transducer module.

In one embodiment of the pressure transducer module, the housing has a bore extending therethrough, which forms a passage or conduit through which fluids flow, when the transducer body is connected within a fluid flow circuit. Aligned and sealably connected to each open end of the bore are flared pressure fittings. The flared pressure fittings are constructed from a chemically inert material and are readily available and known to those skilled in the art. The housing also has a cavity extending from an external surface thereof in communication with the bore. A lip is preferably formed in the housing at the intersection of the cavity and bore. The lip has an inner dimension that is less than the inner dimension of the cavity. The isolation member, pressure sensor, electronic circuit, sealing member, spacer ring and hold down ring are all contained within the cavity of the housing in a manner described in greater detail below, wherein contamination of fluid within the fluid flow circuit is avoided.

The isolation member is sealed against the lip of the housing within the cavity. A ridge may be formed on the lip or an additional seal may be positioned on the lip between the lip and isolation member. In this manner, the cavity of the housing is sealed and isolated from the fluid flow. The isolation member is preferably constructed of an anti-corrosive, chemically inert material with perfluoroalkoxy being preferred. The pressure sensor is bonded, pressed, heat welded or otherwise engaging and adjoining the isolation member to provide intimate contact between the isolation member and the pressure sensor.

In an alternate embodiment, the pressure transducer module includes a removable tubular flexible isolation member that seals at the flared pressure fittings and extends through the bore. When fluids flow through the pressure transducer module, the isolation member is forced radially outward against the inner sides of the bore. The sensor may be positioned adjacent the cavity opening which intersects with the bore such that the sensor is adjacent and adjoins the isolation member. The thin tubular member effectively becomes an "invisible" barrier between the sensor and the fluid flow circuit.

In another embodiment the isolation member wraps around the lower surface and sides of the pressure sensor contained within a cavity of the pressure transducer module. Ridges or other sealing members in the cavity effectively seal the isolation member and sensor to the internal cavity. In this manner, the sensor may be positioned near or in the bore of the housing. A venting and sealing arrangement described below in detail, ensures that the UHP fluid flow is not contaminated by the pressure sensor extending into the bore or fluid flow.

The pressure sensor contained within the pressure transducer module may be of a suitable known construction, and more specifically may be of the capacitance, piezoresistive, or piezoelectric type. A hybrid or fully integrated electronic circuit disposed in the housing is operatively coupled to the pressure sensor and to the aforementioned connector. The electronic circuit develops a signal which corresponds to a measure of the pressure within the flow circuit from information sensed by the pressure sensor. This electronic circuit may also be used in combination with temperature sensitive components to adjust the pressure measurement based upon temperature changes within the flow circuit. As mentioned, the electronic sensor is coupled by electrical conductors to the electrical connector and power may be transmitted to the electronic circuit through the electrical connectors. Further, an analog output such as a standard 4–20 milliamps signal proportional to the calculated pressure may be transmitted through the connector to an external receiver.

OBJECTS

It is accordingly a principal object of the present invention to provide a non-contaminating pressure transducer module connectable to a fluid flow circuit of UHP processing equipment.

Another object of the present invention is to provide a pressure transducer module wherein its pressure sensor component is isolated from the fluid flow circuit by a non-contaminating barrier wherein the affects of the barrier on the accuracy of the pressure measurement are negligible.

A further object of the present invention is to provide an interchangeable isolation member of a UHP processing equipment pressure sensor that may be replaced without contaminating the fluid flow circuit.

A still further object of the pressure invention is to provide a sealing arrangement that further isolates the pressure sensor from contact with fluids from the fluid flow circuit and prevents back flow of fluids back into the fluid flow circuit.

Yet another object of the present invention is to provide a pressure transducer module having an isolation member that is in direct contact and adjoining a pressure sensor, wherein the isolation member acts to isolate the sensor and associated electronic circuitry from potentially corrosive processing chemicals and precludes introduction of contaminating substances into the processing fluids being transported.

Still another object of the present invention is to provide a pressure transducer wherein a gauge pressure or absolute pressure of the flow circuit is measured nonintrusively.

These and other objects, as well as these and other features and advantages of the present invention will become readily apparent to those skilled in the art from a review of the following detailed description of the preferred embodiment in conjunction with the accompanying No claims and drawings in which like numerals in the several views refer to corresponding parts.

DETAILED DESCRIPTION OF THE PREFERRED EMBODIMENT

The present invention represents broadly applicable improvements to a pressure transducer module that is operable within a chemically corrosive ultra high purity environment, wherein an isolating feature of the invention can take form in any of a variety of embodiments. The embodiments detailed herein are intended to be taken as representative or exemplary of those in which the improvements of the invention may be incorporated and are not intended to be limiting. Although suitable for use in UHP processing equipment, those skilled in the art will appreciate that the present invention may also be used in other fluid flow circuits wherein a non-contaminating pressure transducer is desired.

The pressure transducer module of the present invention is generally characterized by a pressure transducer that provides an accurate measurement of the pressure within the processing equipment's flow circuit over a wide range of temperatures. It will be appreciated that the replaceable isolating member adjoins the sensor and is sealed to the housing in a fashion that eliminates the need for sensor fluids while maintaining the accuracy and resolution of the pressure sensor measurement. It is further contemplated that various embodiments of the present invention may utilize different sealing arrangements of the isolating member to the housing. Also, a tubular isolation member may be utilized in a variety of embodiments to further isolate the sensor from fluid flow. In accordance with the drawings, several embodiments will now be described in detail.

Figure 1:
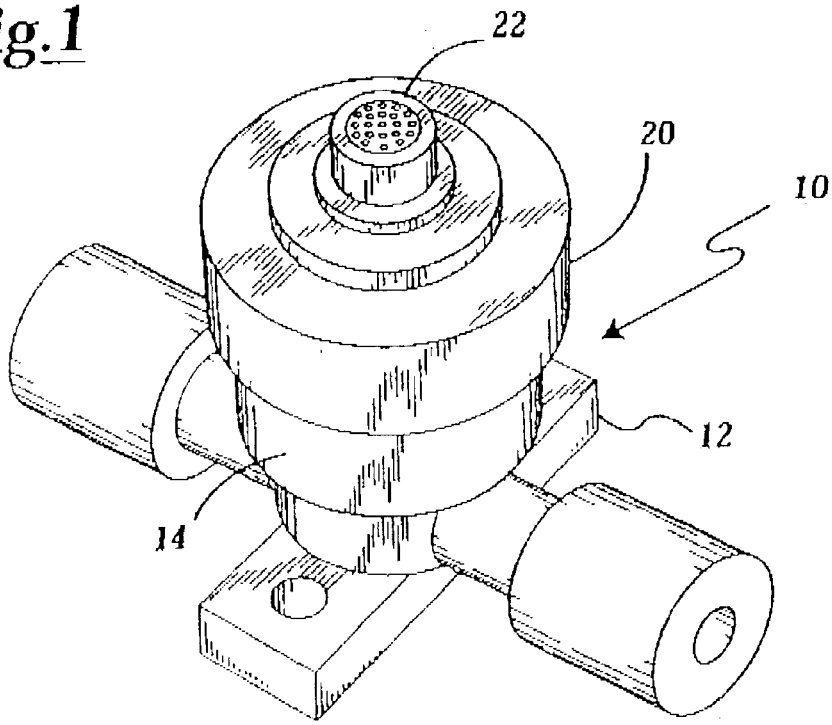
FIG. 1 is a perspective view of a pressure transducer module of the present invention.
Figure 2:
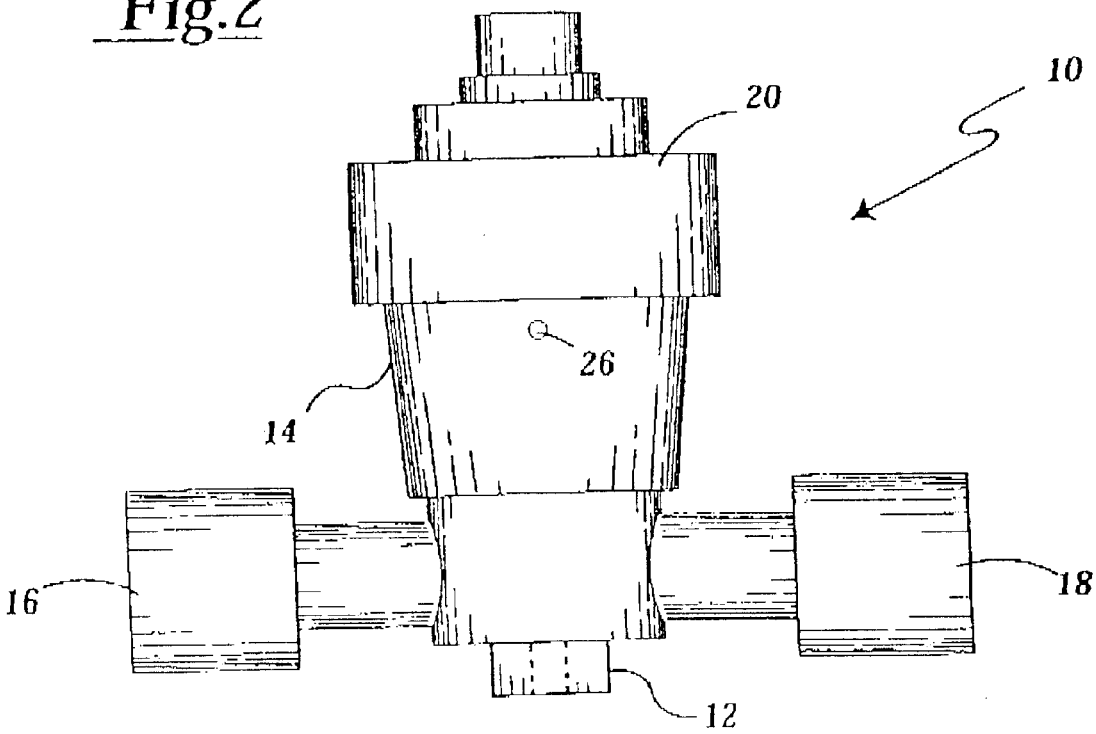
FIG. 2 is a side elevational view of the pressure transducer module of the type shown in FIG. 1.

Referring first to FIGS. 1 and 2, the pressure transducer module is generally identified by numeral 10. The pressure transducer is shown as having a base 12 which is used in mounting the pressure transducer module 10 to processing equipment (not shown). The module generally includes a housing or body 14, pressure fittings 16 and 18 and a cover or cap 20. An electrical connector 22 of known construction may be removably attached to the cover 20. The pressure fittings 16 and 18 serve as an inlet and an outlet to the transducer body 14 and are of known construction.

Those skilled in the art will recognize that the pressure transducer housing may take on various shapes, however a generally cylindrical shape as shown is preferred. A cylindrical pressure transducer body is easily manufactured and fluids flow more readily through a cylindrical bore or cavity with the transducer. The housing 14 and cover 20 are preferably manufactured from a chemically-inert, non-contaminating polymer such as PFA or PTFE.

The cover may have threading formed on an internal surface that mates with threading (as at 24 in FIG. 3) formed on an external surface of the housing. The cover may thus be screwed to the housing and may further have a suitable o-ring seal (not shown) positioned therebetween to allow the cover to be hermetically sealed to the housing. A vent 26, shown in FIG. 2, may be formed through the housing wall, thereby venting an interior of the housing. The vent 26 allows a pressure sensor contained within the housing to determine a gauge pressure. Without such a vent, absolute pressure within the fluid flow circuit is measured. The particular features of the various components of pressure transducer will now be discussed.

Figure 3:
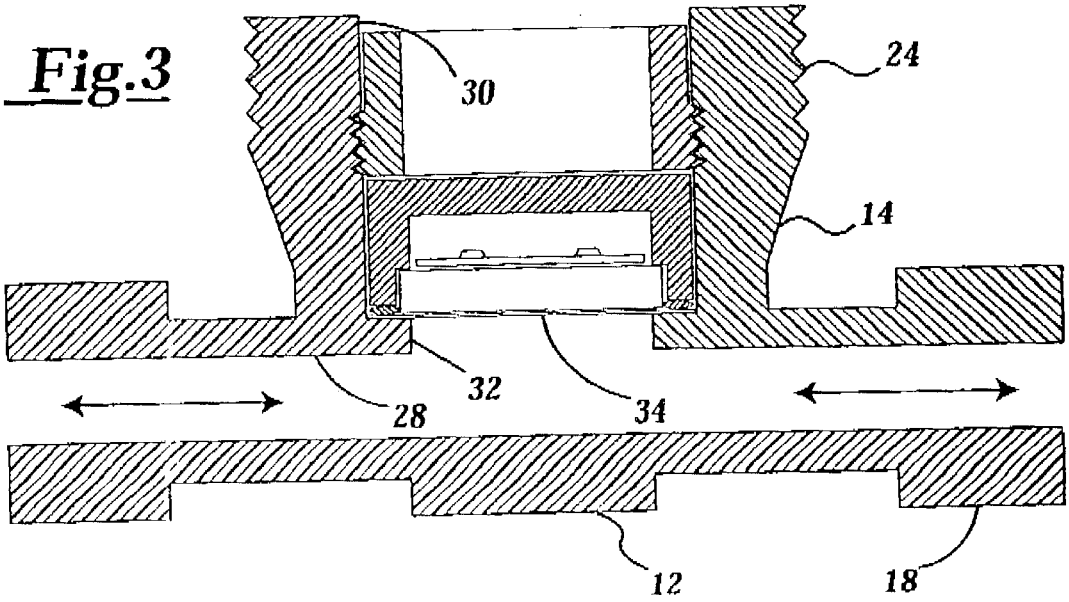
FIG. 3 is a partial sectional side elevational view of the pressure transducer module of the type shown in FIG. 1 having the cap removed.
Figure 4:
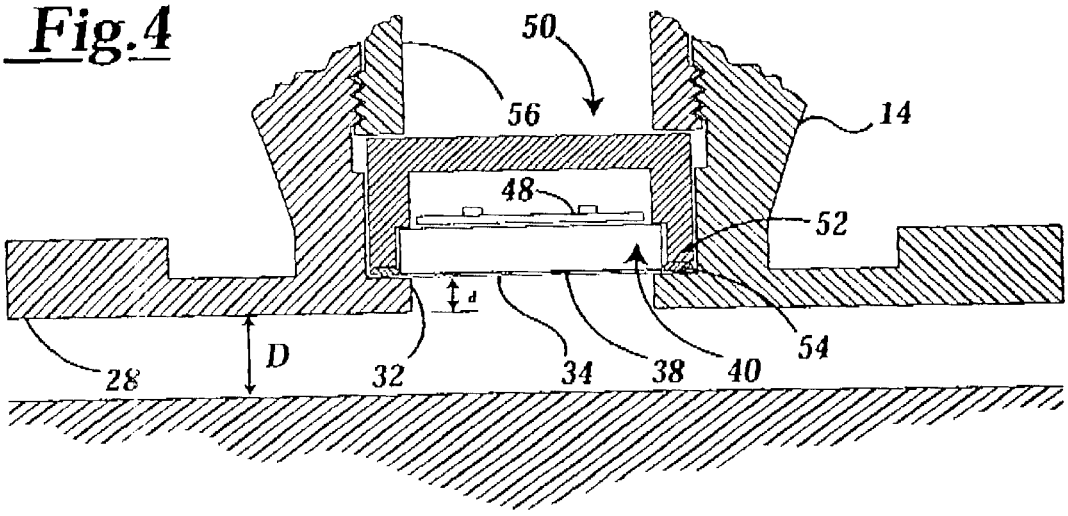
FIG. 4 is an enlarged partial sectional side elevational view of the pressure transducer module shown in FIG. 3.

Referring to FIGS. 3 and 4, the internal construction of the pressure transducer is shown. A bore 28 extends through the housing forming a conduit, whereby when the pressure transducer module 10 is connected in-line, with a fluid flow circuit, via pressure fittings 16 and 18, the bore 28 serves as a passage within the fluid flow circuit. One end of the bore opening forms the inlet and the other end of the bore forms an outlet to the fluid flow circuit. The orientation of the flow with respect to the pressure transducer module within the fluid flow circuit may be reversed without affecting the effectiveness of the pressure transducer.

A cavity 30 extends all the way from an outer surface of the housing 20 to the bore 28. Near the region within the housing where the cavity 30 and bore 28 intersect, an annular lip 32 is formed. The lip 32 further defines an opening to the cavity from the bore. As further discussed below, the lip may have various shapes and include a sealing member incorporated therein.

A thin flexible polymer disk isolation member 34 is positioned on the lip 32 of the cavity. In the preferred embodiment, both the housing 14 and the flexible isolation member 34 are manufactured from chemically inert fluorocarbon polymers. In the preferred embodiment, the disk isolation member is preferably molded rather than sprayed or manufactured by some other process that may leave pinhole paths therein. When the pressure transducer module is fully assembled, the annular surface contact between the flexible isolation member 34 and the housing lip 32 is such that a hermetic seal is formed therebetween.

Figure 5:
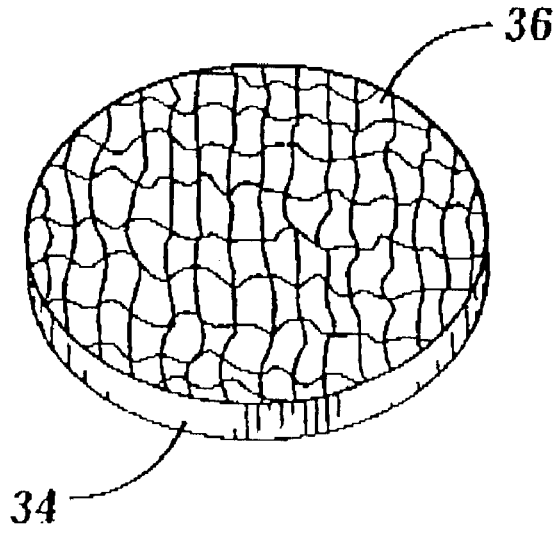
FIG. 5 is an enlarged perspective view of a flexible planar member suitable for use in the assembly of FIGS. 1 through 3.

Referring next to FIG. 5, the thin, flexible, member 34 is shown in greater detail. Without limitation, the member is preferably constructed to have a thickness in a range between 0.001 and 0.040 inches with a thickness of 0.010 inches being preferred *and a diameter of the isolation member substantially larger than the thickness of the flexible member 34 as shown in the figures*. The isolation member is positioned in intimate contact and adjoins the pressure sensor. An isolation member having a thickness greater than 0.040 inches affects the accuracy of the pressure measurement. Also, an isolation member thinner than 0.001 inches is difficult to manufacture and an undesirable amount of fluid may permeate back and forth through such a thin member. The upper surface 36 of the isolation member may be abraded so as to create a pattern of grooves or channels. When the abraded upper surface 36 of the member is pressed against the base 38 of the pressure sensor 40 (see also FIG. 4), any air pockets that might otherwise have formed between the sensor base 38 and the member are relieved, allowing more intimate contact between the member and the pressure sensor 40. The flange 5 52 of the spacer 50 and the o-ring 54 are dimensioned to allow a slight gap between the sensor 40, o-ring 54, and spacer 50. The inner surface of the spacer 50 may also have a pattern of grooves or channels formed thereon, thereby creating a passage for the relieved air to escape into a central region of the cavity.

Referring again to FIGS. 3 and 4, the pressure sensor 40 is positioned on top of and pressed against the flexible member 34. The pressure sensor may be of a capacitance, piezoresistive, or piezoelectric type known to those skilled in the art. The base 38 of the pressure sensor is in direct contact with the member and may be either in pressure contact with or bonded to the member by an adhesive, thermal welding or by other known means.

Figure 6:
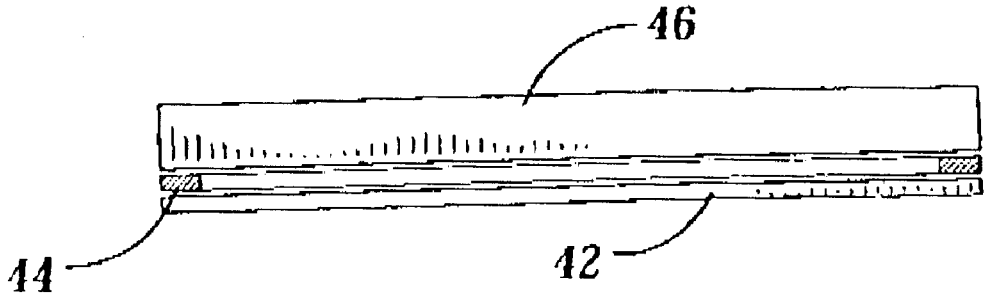
FIG. 6 is a side elevational view of an alumina ceramic capacitive pressure sensor.

In one embodiment generally shown in FIG. 6, an alumina ceramic pressure sensor is comprised of a thin, generally compliant ceramic sheet 42 having an insulating spacer ring 44 sandwiched between a thicker, non-compliant ceramic sheet 46. The first thin ceramic sheet or diaphragm is approximately 0.005 to 0.050 inches in thickness with a typical thickness of 0.020 inches. The thicker ceramic sheet has a thickness range between 0.100 to 0.500 inches. The spacer may be constructed of a suitable material such as a glass, ceramic, braze, or polymer, glass being preferred. The opposed faces of ceramic disks 42 and 46 are metalized by metals such as gold, nickel or chrome to create plates of a capacitor. A similar capacitive pressure transducer is described by Bell et al. in U.S. Patent 4,177,496 (the '496 patent). Those skilled in the art will appreciate that a sapphire pressure sensor or other capacitive pressure transducers similar to that described in the '496 patent may be implemented into the present invention. Referring again to FIG. 4, an electronic circuit module 48 is positioned above the ceramic pressure sensor 40 and is electrically coupled to the conductive surfaces of the ceramic pressure sensor. The electronic circuit module 48 is also connected by suitable leads or conducting wires (not shown) to interval contacts of the connector 22 (FIG. 1). In the preferred embodiment the electrical connector 22 is made of a chemically inert material and preferably may be of a type available from Pneumatico, part number po3rsd-00004-24.

The electronic circuit module 48 develops a control signal proportional to the measured pressure within the flow circuit using analog information received from the pressure sensor 40 related to changes in its capacitance due to deformation of member 42 by the fluid pressure acting on it. The electronic circuit may also adjust the signal proportional to the measured pressure as the temperature within the flow circuit changes by including a thermistor or like component therein.

In FIGS. 3 and 4, a cup shaped spacer member 50 is disposed above the pressure sensor 40 so as to exert,a force on the upper surface of the pressure sensor 40, holding the sensor flat against the member 34. The spacer 50 further has a circumferential flange 52 (FIG. 4) which transfers a force against the member 34 and lip 32 of the cavity. An o-ring 54 may be positioned between the flange 52 of the spacer and the isolation member, wherein through its elastomeric properties, the force may be transferred from the spacer member 50 against the isolation member to clamp it against the annular cavity lip 32. A threaded hold down ring 56 is rotated in mating relation with the inner threads of the cavity of the housing or body 14, thereby engaging the spacer member 50 and forcing it against the pressure sensor 40 and isolation member 34.

In order to reduce dead space, the distance "d" (FIG. 4) that the flexible isolation member is displaced from the lumen of the bore 28 should be kept to a minimum. The decrease in dead space reduces the chance of accumulation of debris and contamination. The decrease in dead space also reduces or eliminates the chance of air bubbles being trapped in the dead space and then suddenly released back into the flow circuit. The release of these air bubbles from the dead space has a negative impact on the semiconductor processing. The inner diameter of the lumen "D" should be equal to or exceed 2*(d). Ideally, the dimension, d, will be far less than the dimension, D, in measurement.

Figure 7:
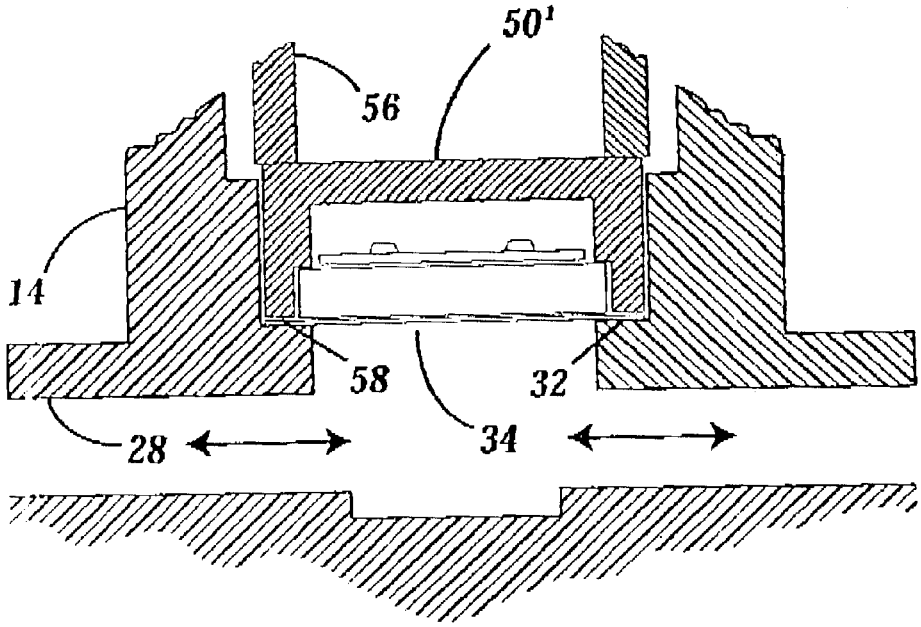
FIG. 7 is an enlarged partial sectional side elevational view of an alternate embodiment of the pressure transducer module of the present invention.
Figure 13:
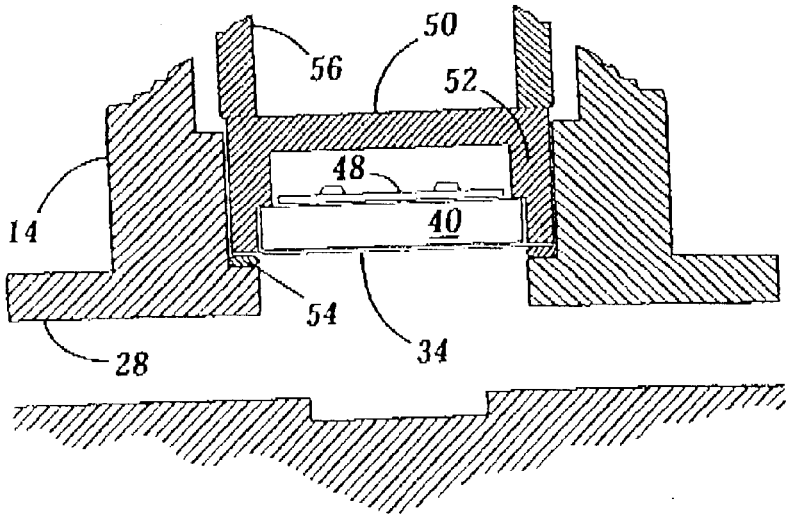
FIG. 13 is an enlarged partial sectional side elevational view of another embodiment of the pressure transducer module of the type shown in FIG. 1.

FIG. 7 shows an alternate embodiment wherein the spacer member 50 has rounded edges as at 58. The rounded edges help focus the force of the spacer 50 against the flexible isolation member 34 and the lip 32 of the cavity. This arrangement also eliminates the need for the o-ring 54. However, o-ring 54 may be positioned between the isolation member and the lip 32 (see FIG. 13). The flange 52 of the spacer 50 and the o-ring 54 are dimensioned to allow a slight gap between the sensor 40, o-ring 54, and spacer 50. The inner surface of the spacer 50 may also have a pattern of grooves or channels formed thereon, thereby creating a passage for the relieved air to escape. Further, a spacer 50' may have a bore extending through a center section, thereby extending the passage into the cavity of the housing.

Figure 8:
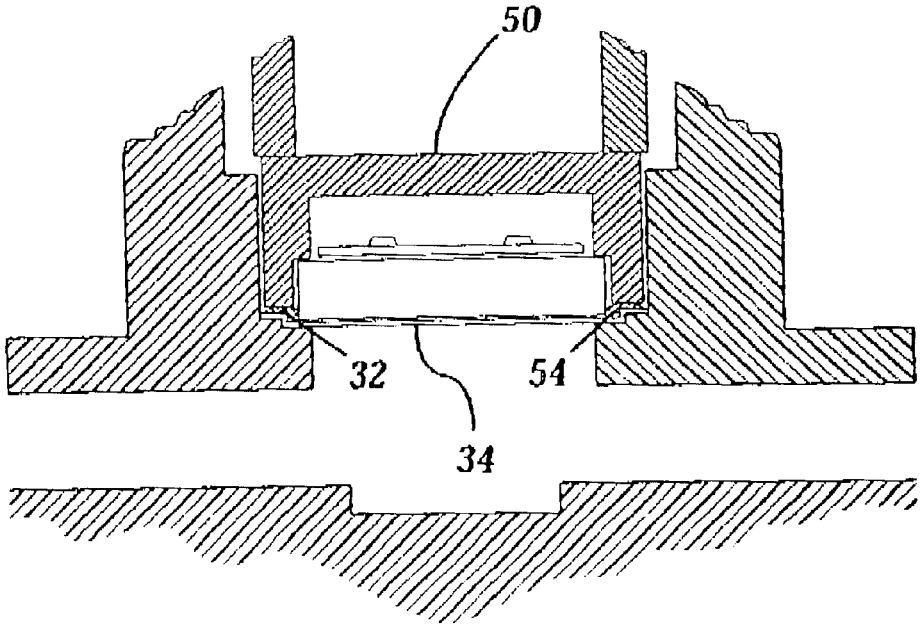
FIG. 8 is an enlarged partial sectional side elevational view of another alternate embodiment of the pressure transducer module of the present invention.
Figure 15:
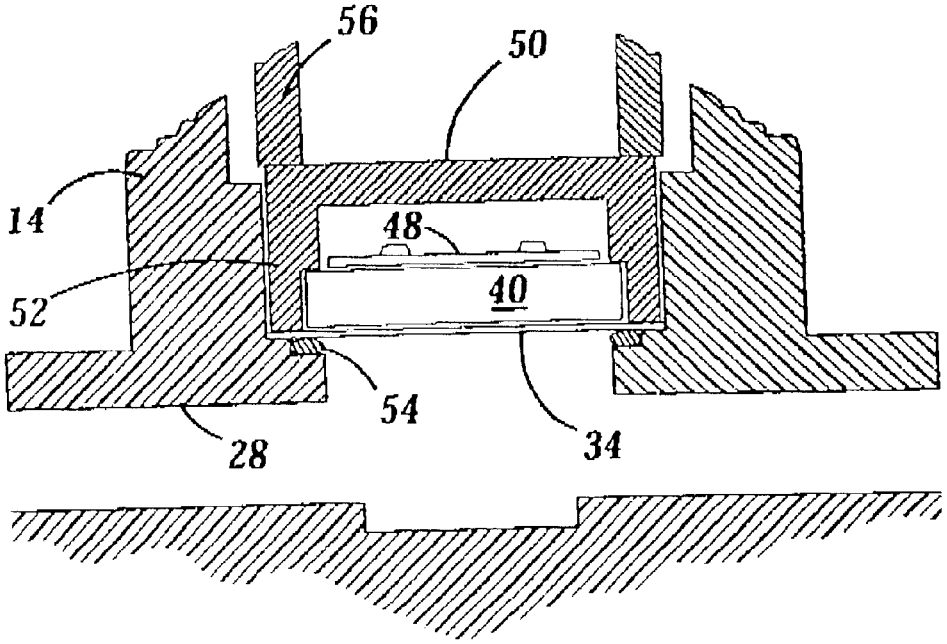
FIG. 15 is an enlarged partial sectional side elevational view of another embodiment of the pressure transducer module of the type shown in FIG. 1.

FIG. 8 illustrates another preferred embodiment wherein the lip 32' of the cavity is stepped. The o-ring 54, when compressed by the spacer member 50, is made to conform to the shape of the step and pushes or forces the flexible isolation member 34, causing it to bend and mold to the shape of the stepped lip 32 to provide a seal against ingress of fluid. In yet another embodiment, the o-ring 54 may be positioned between the isolation member and the lip 32' (see FIG. 15).

Figure 9:
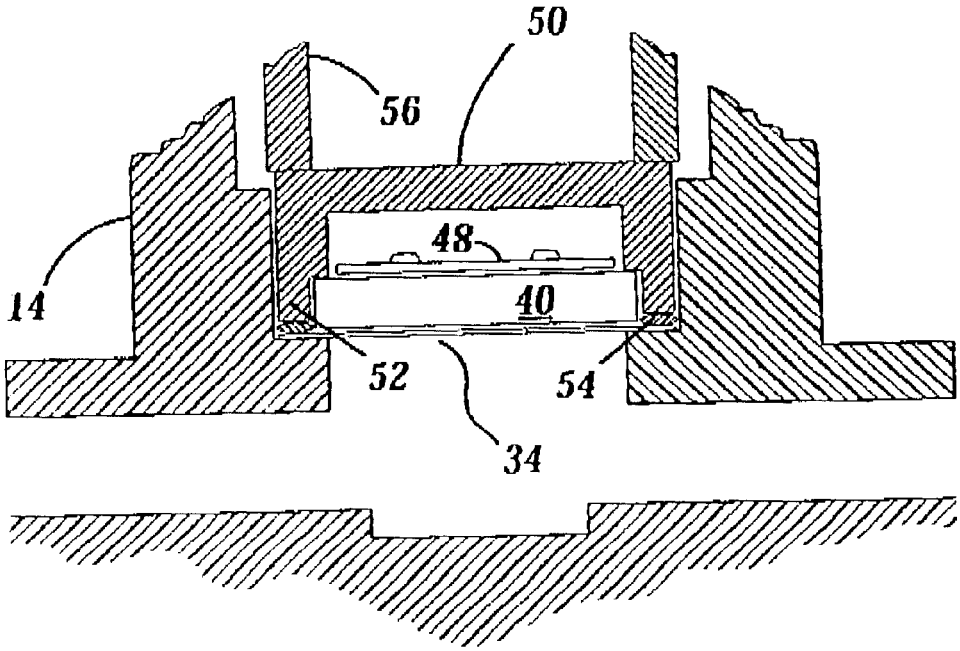
FIG. 9 is an enlarged partial sectional side elevational view of another embodiment of the pressure transducer module of the present invention.

FIG. 9 illustrates another preferred embodiment having the end of the spacer member flange 52 rounded, wherein the flange is forced against the o-ring 54 which, in turn, forces the o-ring against the flexible isolation member 34.

Figure 10:
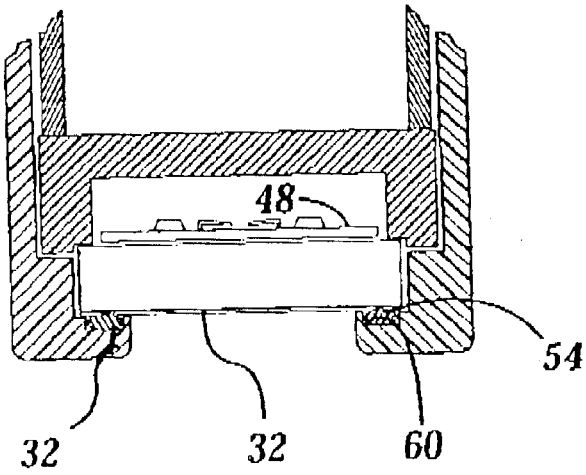
FIG. 10 is an enlarged partial sectional side elevational view of another embodiment of the pressure transducer module of the present invention.

FIG. 10 illustrates yet another preferred embodiment wherein the o-ring seal 54' is contained within an annular groove or recess 60 formed within the lip 32'. The flexible isolation member 34 is forced against the o-ring 54', sealing the edges of the lip 32' thereby preventing the fluid of the flow circuit from leaking into the cavity of the housing. This shield arrangement is preferred in circumstances where the fluid flow pressure is less than the atmospheric pressure. In such a circumstance, the shield arrangement eliminates the possibility of the o-ring being drawn into the fluid flow circuit.

Figure 11:
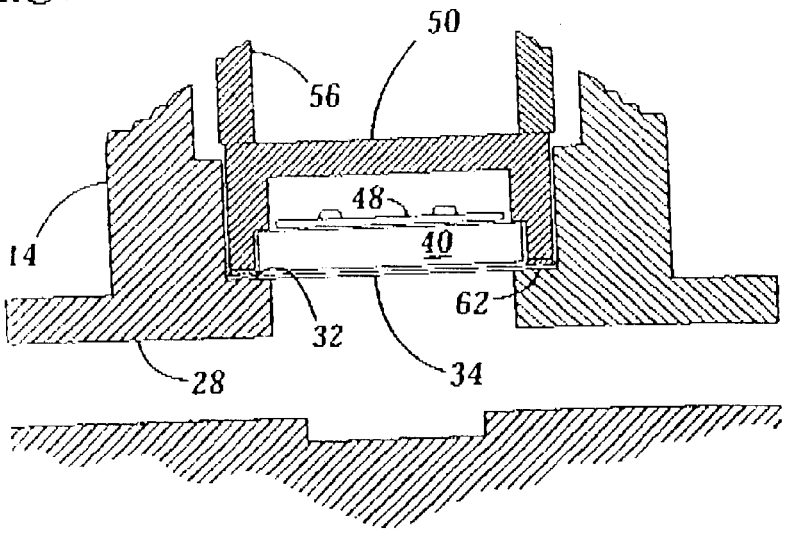
FIG. 11 is an enlarged partial sectional side elevational view of another pressure transducer module constructed in accordance with the present invention.

FIG. 11 illustrates yet another embodiment wherein an annular ridge 62 is formed along the surface of the lip 32. When the isolation member is compressed against the lip, the isolation member conforms to the shape of the ridge. In this manner, an effective seal is formed between the member sheet and the housing lip.

Figure 12:
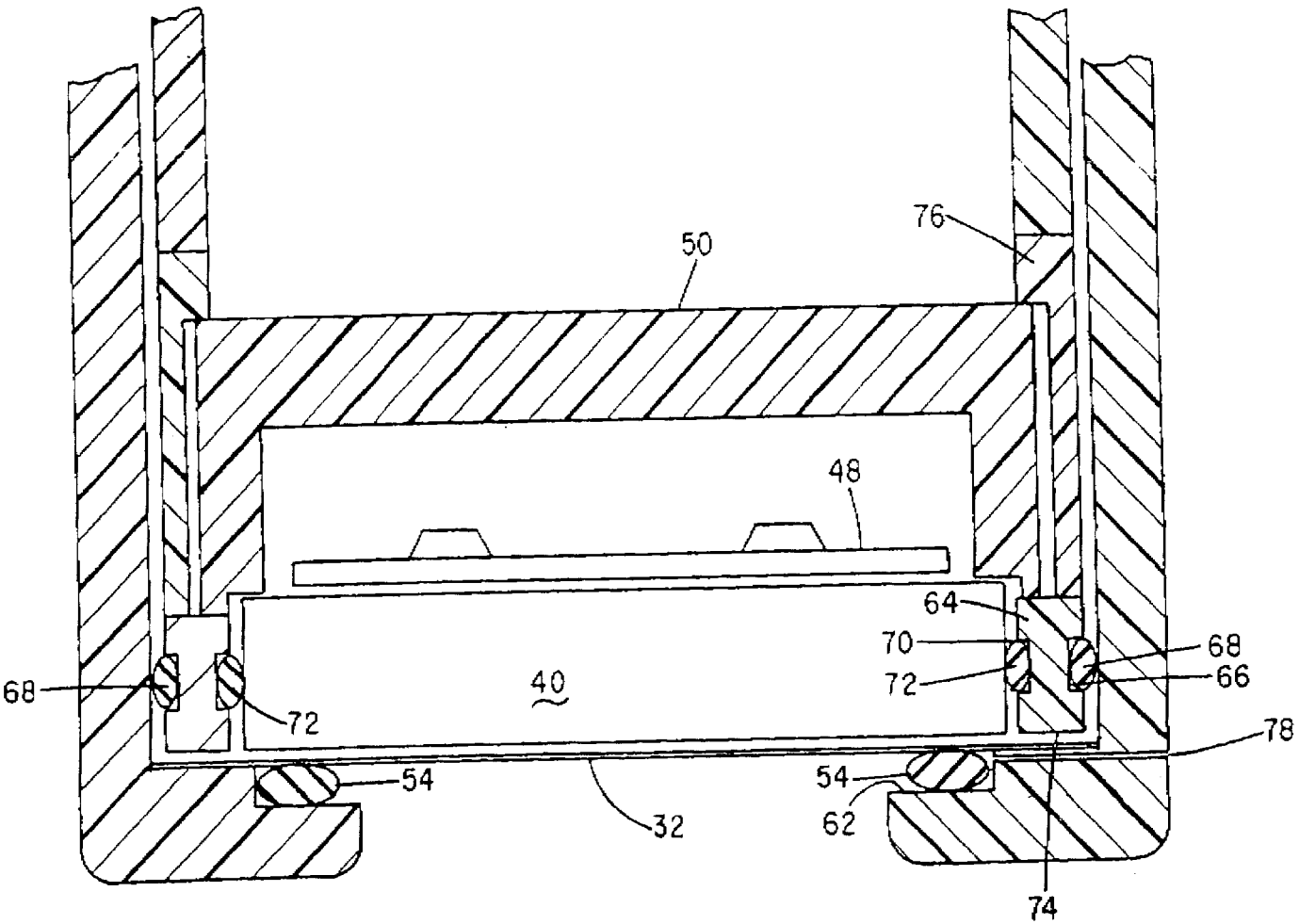
FIG. 12 is an enlarged partial sectional side elevational view of another embodiment of the pressure transducer module of the present invention.
Figure 14:
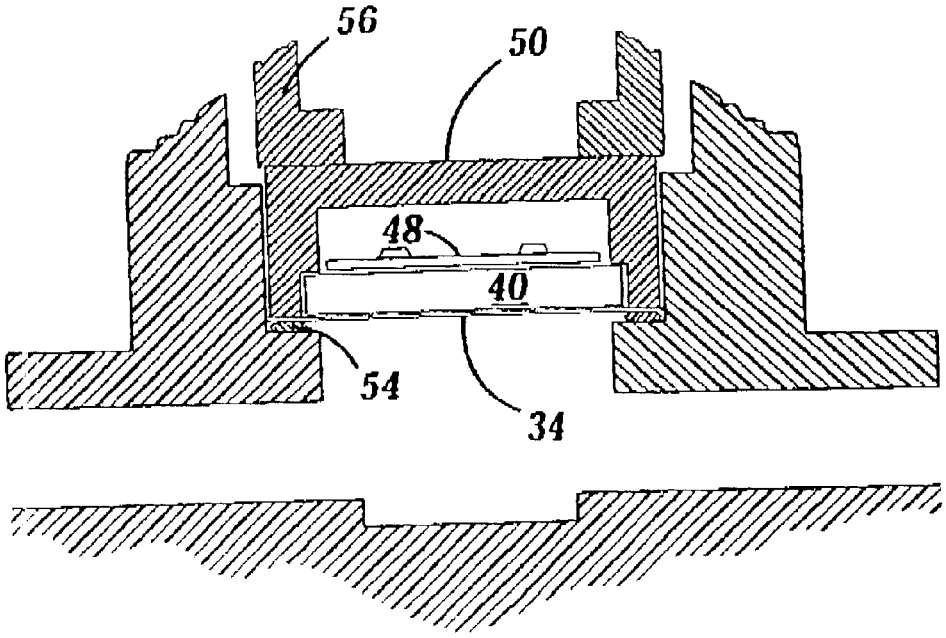
FIG. 14 is an enlarged partial sectional side elevational view another embodiment of the pressure transducer module of the type shown in FIG. 1.

FIG. 12 shows yet another embodiment wherein the lip has a multiple step wherein the o-ring 54 is positioned on the lower step below the isolation member 34. An additional annular sealing ring 64 having an external groove 66 for receiving an o-ring 68 and an internal groove 70 for receiving an o-ring 72 provides an additional seal between the housing 14 and the pressure sensor 40. The additional annular sealing ring 64 is shown as being positioned between a top step 74, and the first spacer ring 76. The spacer member 50 is in direct contact with both the first spacer ring 76 and the pressure sensor 40. In this manner, the interior of the housing is sealed from the fluid circuit independently of the seal created between the member 34 and the pressure sensor 40. A drain channel 78 extends through the housing 14 to an external surface. The drain channel 78 is positioned between the top step 74 and the lower step to which the seal 54 is in contact. If fluid from the flow circuit leaks past o-ring 54, the drain channel 78 allows this fluid to drain out of the housing without contaminating or affecting the sensor 40 or regressing back into the flow circuit. The drain channel 78 also provides a visual indicator to the user that fluids have permeated, leaked, or otherwise made it past the first seal or o-ring 54. This visual indication is commonly referred to in the industry as a leak indicator.

When the o-ring 54 is positioned on the fluid flow circuit side (see FIGS. 10 and 12–15), the o-ring must be manufactured from a chemically inert material. An elastomeric perfluorocarbon such as KALREZ available from duPont Nemours, Inc., is suitable for this purpose. Other materials such as CHEMRAZ, an elastomeric PTFE available from Greene, Tweed & Co., Inc. is equally suitable.

Figure 16:
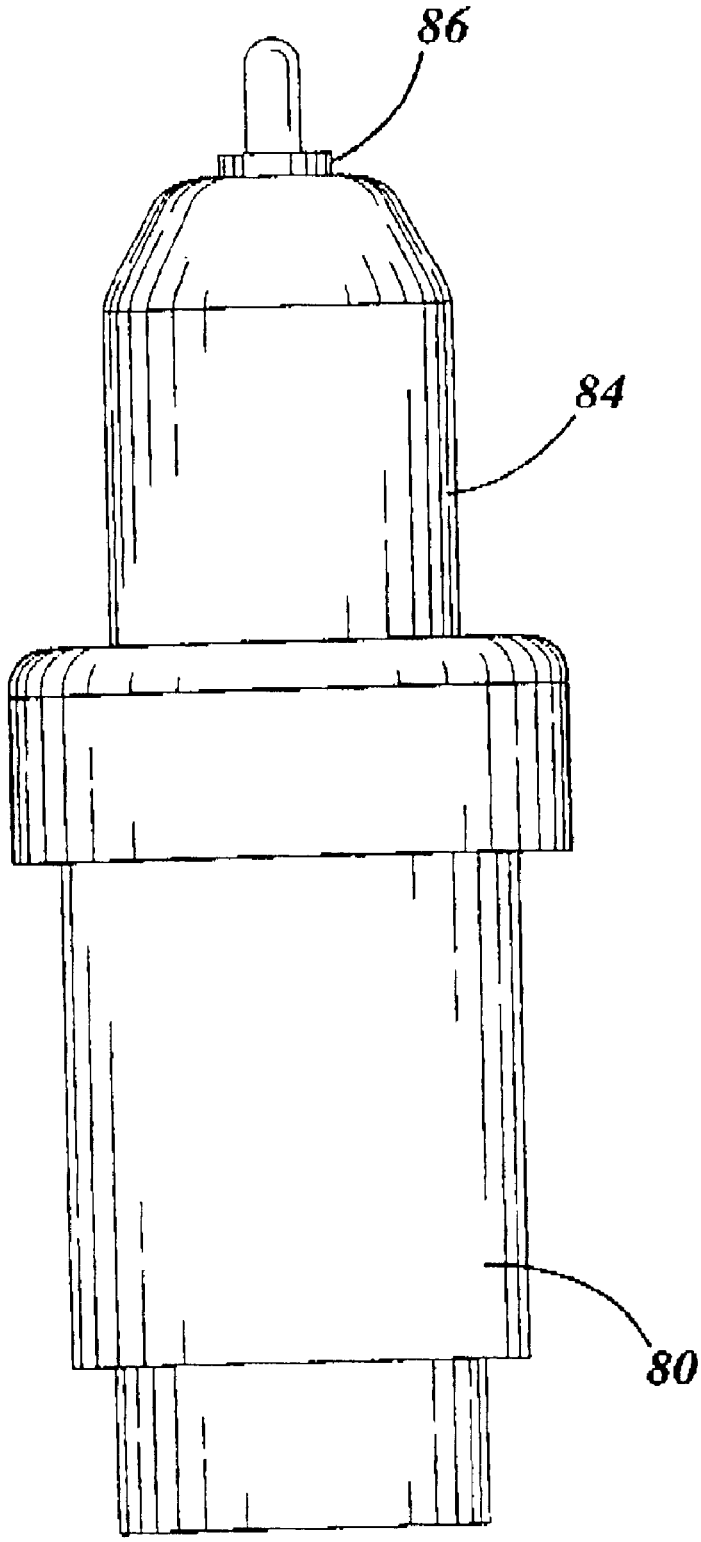
FIG. 16 is a side elevational view of another pressure transducer module constructed in accordance with the present invention.
Figure 17:
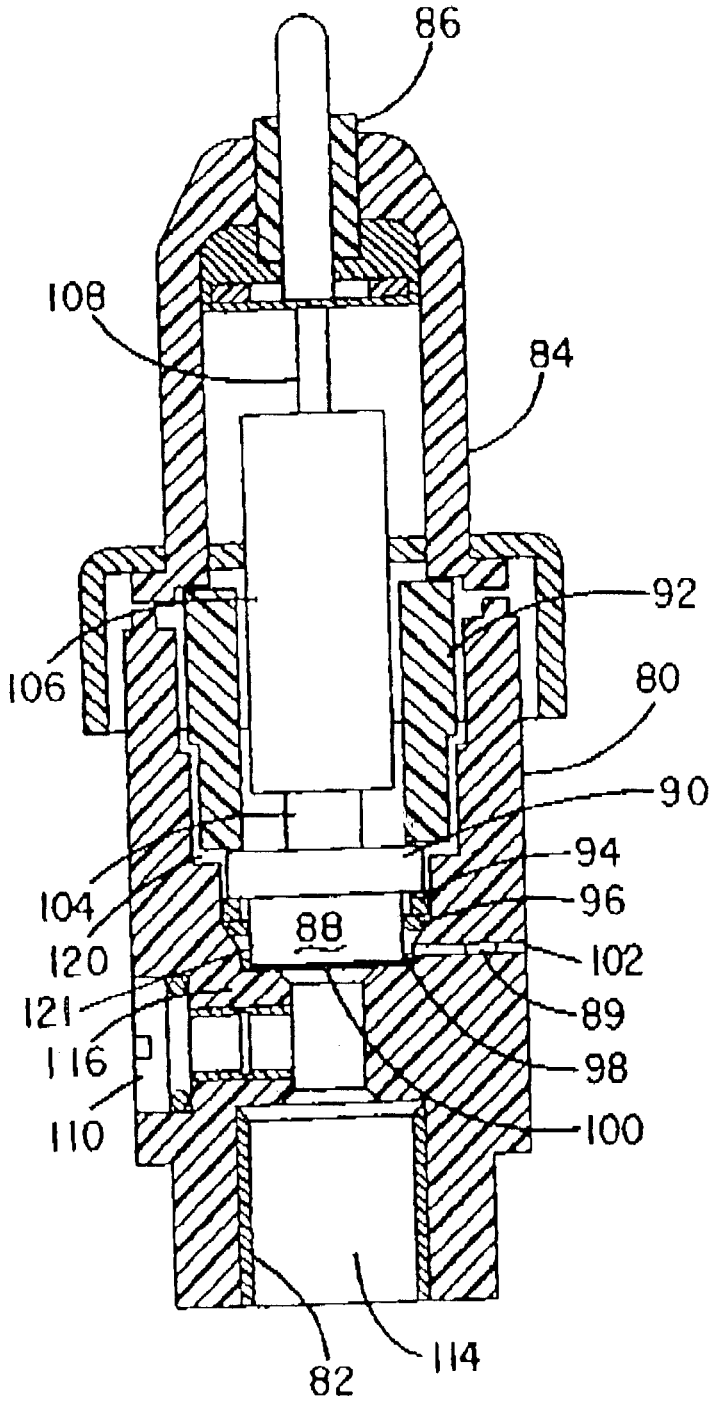
FIG. 17 is a partial sectional side elevational view of the pressure transducer module of the type shown in FIG. 16.

Referring now to FIGS. 16 and 17 another embodiment of the pressure transducer module 10 is shown. The module generally includes a housing or body 80, flared pressure fitting 82 (only a portion of which is shown) and a cover or cap 84. An electrical connecting member 86 of known construction may be removably attached to the cover 84. The flared pressure fitting 82 serves as an inlet to the transducer body 80 and is of known construction. FIG. 17 shows a pressure sensor 88, spacer ring 90, hold down ring 92, sealing spacer 94, sealing members 96–98, and isolation member 100 positioned within the cavity 120 of the housing 80. Those skilled in the art will appreciate that housing 80, cover 84, spacer ring 90, hold down ring 92, sealing spacer 94, and isolation member 100 may be manufactured from the same chemically inert material including fully fluorinated fluorocarbon polymers (including PFA, PTFE, and FEP), partially fluorinated fluorocarbon polymers (including ETFE, CTFE, ECTFE, and PVDF), and high performance engineering thermoplastics (including PEEK). The sealing members may be manufactured from suitable chemically inert polymers including elastomeric perfluorocarbons (including elastomeric polytetrafluoroethylene).

A drain or vent 102 extends from an outer surface of the housing 80 into [the] *that portion of* cavity 120 between sealing members 96 and 98 (*chamber 121*). The vent may include an internally threaded bore adapted for receiving a tubing member (not shown) used to isolate and direct fluids from the vent 102. Further, the vent may include a sensor 89 of known suitable construction coupled to the integrated circuit 106, wherein the sensor 89 transmits a signal when predetermined fluids flow past or [in] contact [with] the sensor 89 in the vent 102. An integrated circuit 106 is electrically coupled to the sensor 88 via electrical wires 104. Electrical wires 108 electrically couple the integrated circuit 106 to the connecting member 86. Those skilled in the art will appreciate that a pigtail cable with a corrosion resistant outer sheath may extend from the connecting member 86. Further, the outer 84 may include internal threading (see FIG. 3) to thereby engage the cover to the housing 80.

The cavity 120 intersects with a bore 114 extending from an external surface of the housing into the housing 80. The pressure fitting 82 is coupled to the housing 80 in alignment with the bore 114 and in a well known manner. The cavity 120 forms a ledge 116 near the bore 114 to which the sensor 88 and isolation member 100 are engaged. A plug 110 positioned within a passage extending from an external surface of the housing into the bore 114. An annular groove 118 is formed in the ledge 116 (see FIG. 26) and provides an increased sealing surface between the ledge and sealing member 98 positioned therein. Another sealing member 96 is positioned between the pressure sensor 88 and an internal surface of the cavity 120, thereby providing a redundant seal or trap to prevent any minute amounts of fluids from flowing above the sensor 88 sidewalls and contaminating the integrated circuit 106 positioned above the sensor 88. The cavity wall adjacent the sealing member 96 may be beveled to provide a sealing surface between the sensor 88 and cavity 120. The sealing spacer 94 transfers a force from the spacer ring 90, thereby compressing the sealing member 96 against the beveled sidewall.

Figure 18:
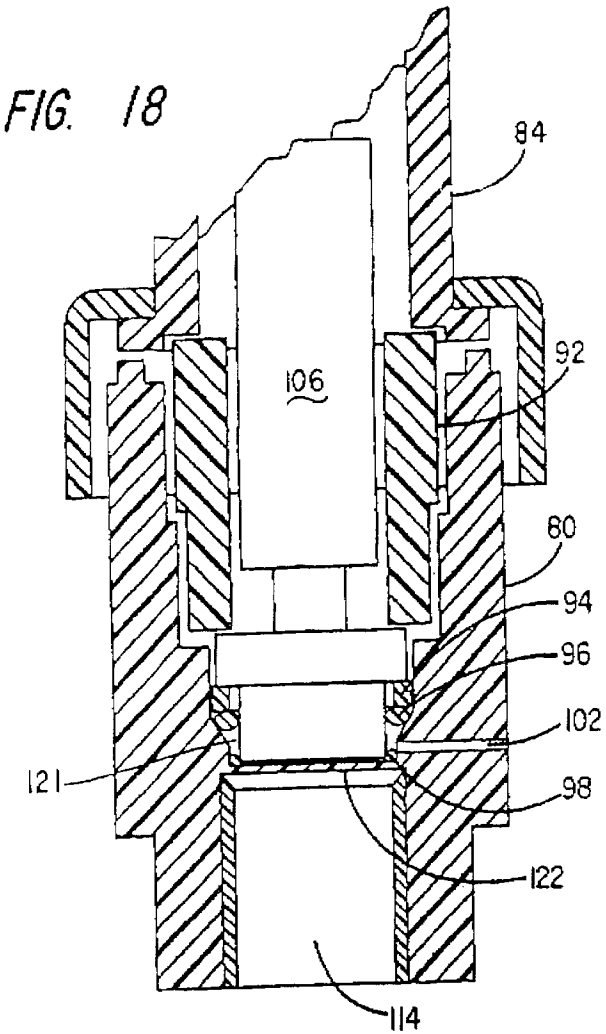
FIG. 18 is a fragmentary partial sectional side elevational view of an alternate embodiment of the pressure transducer module of the type shown in FIG. 16.

FIG. 18 shows the housing 80 modified to eliminate the need for a redundant sealing arrangement. A thin wall 122 is molded integral with the housing 80 and separates the cavity 120 from the bore 114. The thin wall 122 having a thickness between 0.005 and 0.040 inches acts as the isolation member 100. The thin wall must be molded thin enough to be flexible and allow the pressure sensor to effectively operate without interfering with an accurate measurement of pressure, however a thin wall [100] *122* molded too thin (approximately less than 0.005 inches) will not effectively block fluids from permeating through the wall [100] *122* and into the cavity 88. The drain channel *or vent* 102 extends from the external surface of the housing 80 into *that portion of* the cavity 120 *that forms chamber 121*. In the event fluids permeate through the thin wall 122, the fluid drains out the channel 102 and avoids contamination with the integrated circuit. Those skilled in the art will appreciate that the sealing members may be positioned within the cavity 120, as described above, for added preventative measures to avoid contaminating contact between the processing fluids and the integrated circuit 106.

Figure 19:
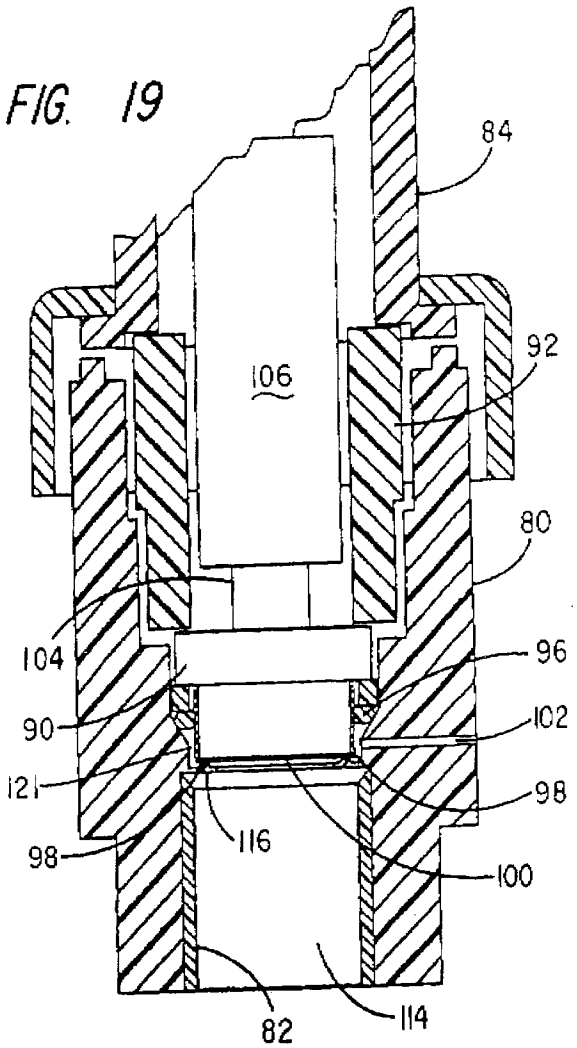
FIG. 19 is a fragmentary partial sectional side elevational view of an alternate embodiment of the pressure transducer module of the type shown in FIG. 16.

FIG. 19 shows another modified embodiment of the housing 80, wherein the flexible member 100 extends up the sides of the sensor 88 such that both the bottom and sides of the sensor 88 engage the isolation member 100 against the internal sides of the housing 80 defined by the cavity 120.

The sealing member 98 is formed into the ledge 116. Fluid flows through the opening formed by the ledge 116 and forces the isolation member 100 against the sensor 88. When the isolation member 100 is pressed against the sealing member or ridge 98, the flexible member tends to conform to the shape of the sealing member or ridge 98, thereby providing a sealing member between the housing and isolation member 100.

Figure 20:
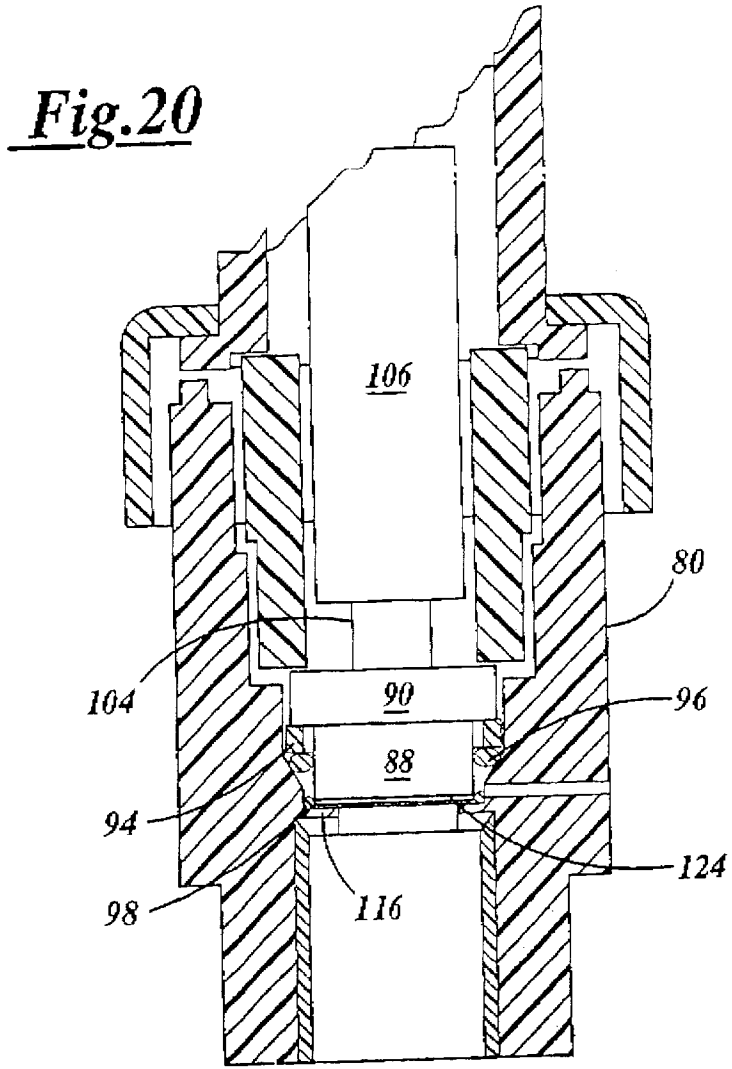
FIG. 20 is a fragmentary partial sectional side elevational view of an alternate embodiment of the housing of the pressure transducer module in accordance with the present invention.

FIG. 20 shows another embodiment of the present invention. The isolation member 100 is not shown positioned between the ledge 116 and the sensor 88. Instead, a ceramic pressure sensor is shown having a layer of sapphire 124 bonded, engaged, formed or otherwise defining the lower surface of the sensor 88. The sapphire layer may be an additional layer to the ceramic sensor or may replace the lower layer 42 of the ceramic sensor (see FIG. 6). The sapphire layer 124 is chemically inert and highly resistive to the corrosive nature of the chemicals used in the UHP processing equipment. The sapphire layer 124 acts as the isolation member and seals against the sealing member 98.

Figure 21:
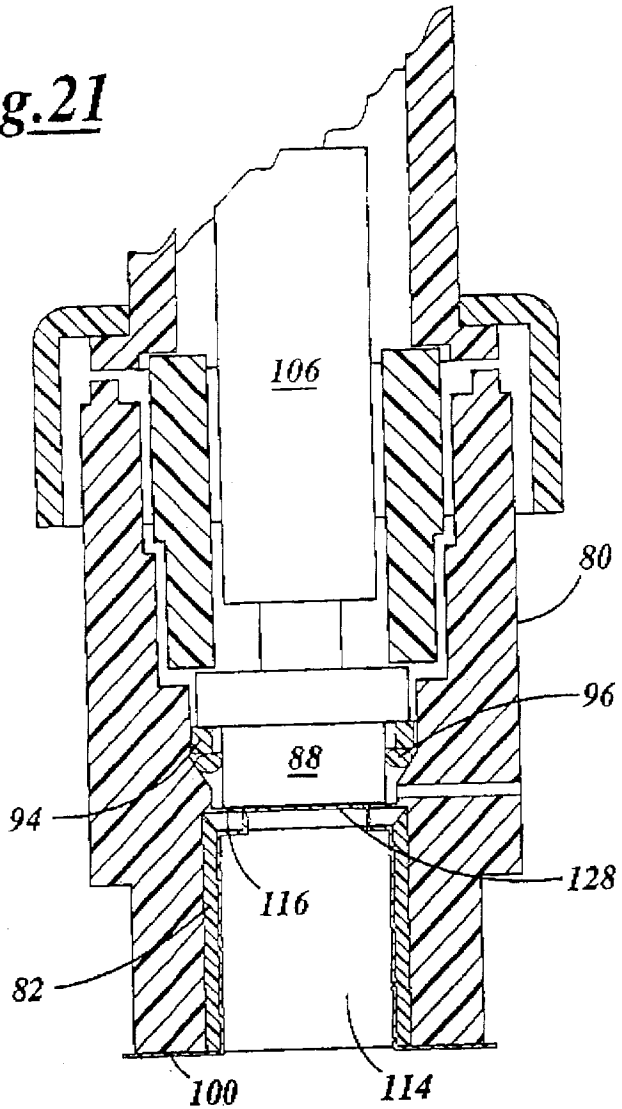
FIG. 21 is a fragmentary partial sectional side elevational view of an alternate embodiment of the pressure transducer module in accordance with the present invention.

FIG. 21 shows another embodiment wherein the isolation member 100 is tubular in nature, wherein a free end of the tube or isolation member 100 wraps around the lower end of the bore 114 opening such that the flared pressure fitting seals the free end of the tube against the housing 80. The fixed or terminal end 128 of the tube is closed and conforms to the shape of the opening between the cavity 120 and the bore 114. Fluid flows through the tube and forces the isolation member 100 against the sensor 88. Various known suitably chemically inert thermoplastic materials may be used to form the tube or isolation member 100, with fluoropolymers being preferred. The sealing and drain arrangement as described above may be utilized as shown to further isolate the integrated circuit 106 from any potentially damaging chemicals.

Figure 22:
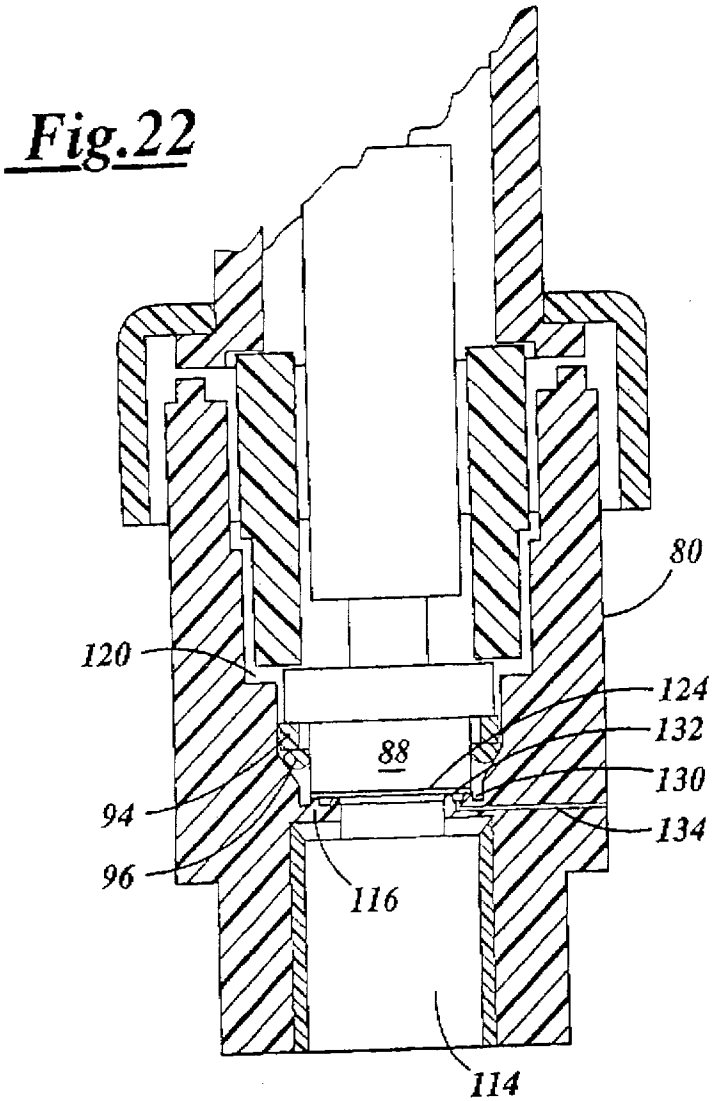
FIG. 22 is a fragmentary partial sectional side elevational view of an alternate embodiment of the pressure transducer module in accordance with the present invention.

Referring to FIG. 22, the sapphire layer 124 may be incorporated into the sensor 88 as described above, wherein the face or lower surface of the sapphire layer engages the ledge 116. The ledge 116 includes multiple sealing members 130 and 132 that seal and engage against the face of the sapphire sensor. Those skilled in the art will appreciate that the sealing members 130 and 132 may be constructed of chemically inert elastomers or formed as ridges in the top surface of the ledge 116. Additionally, a combination of elastomers and ridges may be utilized as desired. In this manner a redundant seal may be formed on the face or lower surface of the sapphire layer 124. Of course, the sealing members may be utilized in any of the several embodiments wherein the sealing member 98 is positioned under the face or lower surface of the sensor 88. A drain channel 134 extends from an outer surface of the housing 80, through a portion of ledge 116 and into the cavity 120 between the two annular sealing members 98.

Figure 23:
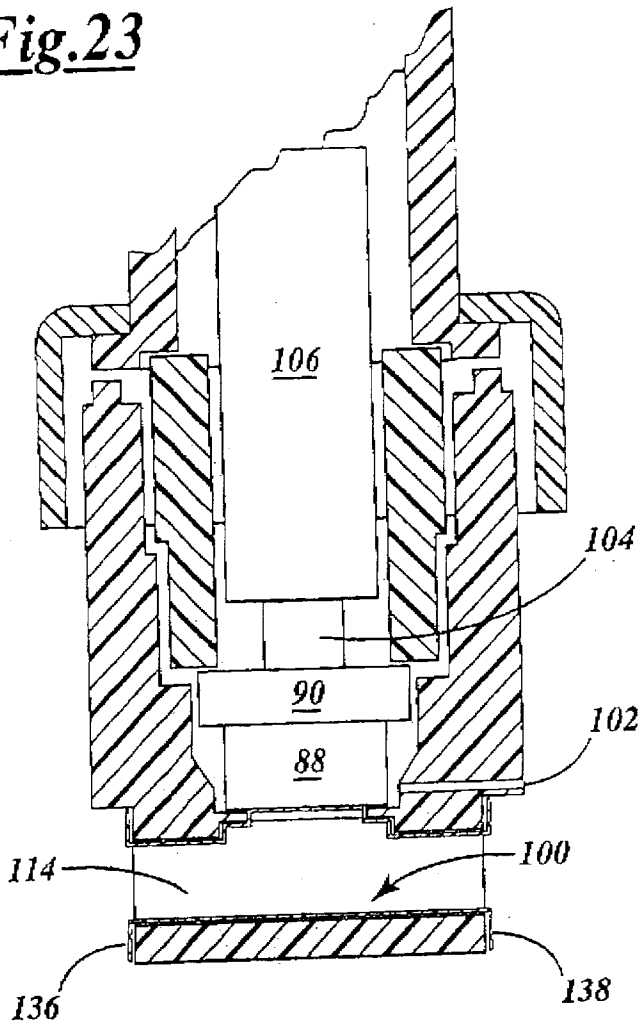
FIG. 23 is a partial sectional side elevational view of an alternate embodiment of the pressure transducer module in accordance with the present invention.

FIG. 23 shows another embodiment of the invention, wherein the isolation member 100 is a formed as a tubular member having open ends 136–138. Each end extends past and overlaps a corresponding end of the bore 114. The tubular member may be manufactured consistent with the above description of the tubular member utilized in the embodiment shown in FIG. 21. As fluid flows through the flow-through bore 114, the pressure forces the isolation member outward, engaging a portion of the isolation member 100 against the sensor 88.

Figure 24:
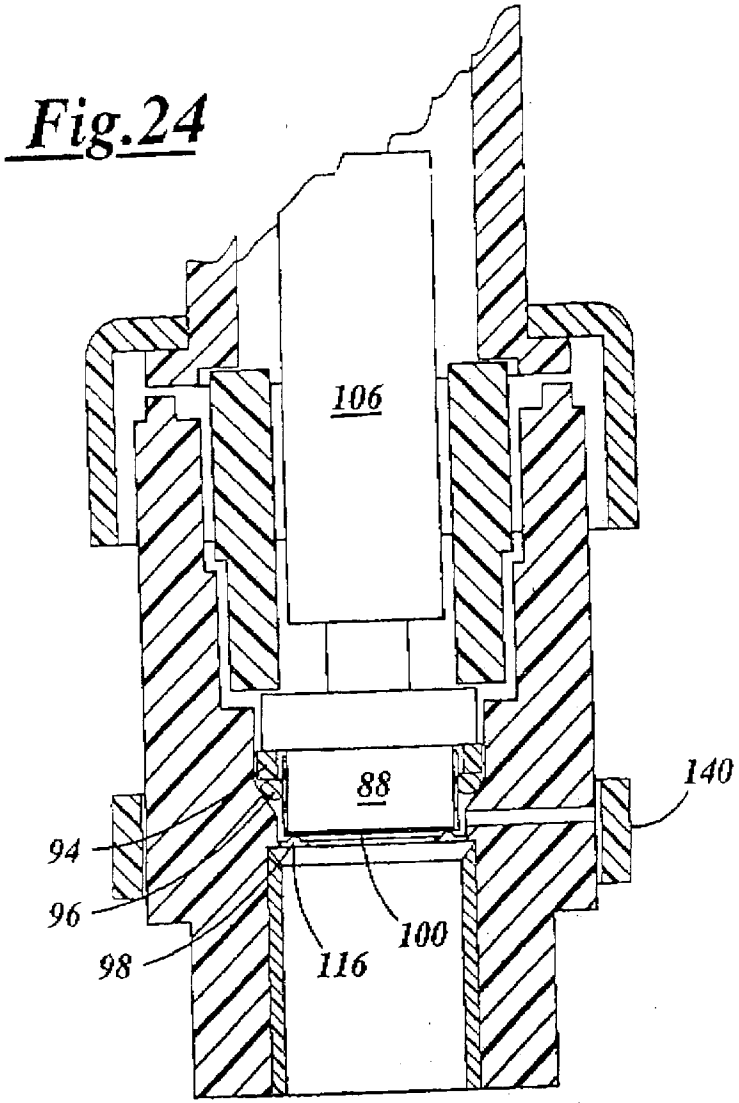
FIG. 24 is a fragmentary partial sectional side elevational view of an alternate embodiment of the pressure transducer module in accordance with the present invention.

FIG. 24 shows the housing 80 having an outer ring 140 engaging the housing proximate the intersection of the bore 114 and cavity 120. The outer ring is constructed of a suitable known material having a low co-efficient of expansion, ceramic for example, and restricts expansion of the housing 80 near the sealing members 96 and 98. Those skilled in the art will appreciate that the ceramic ring 140 may be utilized in any of the embodiments to control the expansion of the housing as desired.

Figure 25:
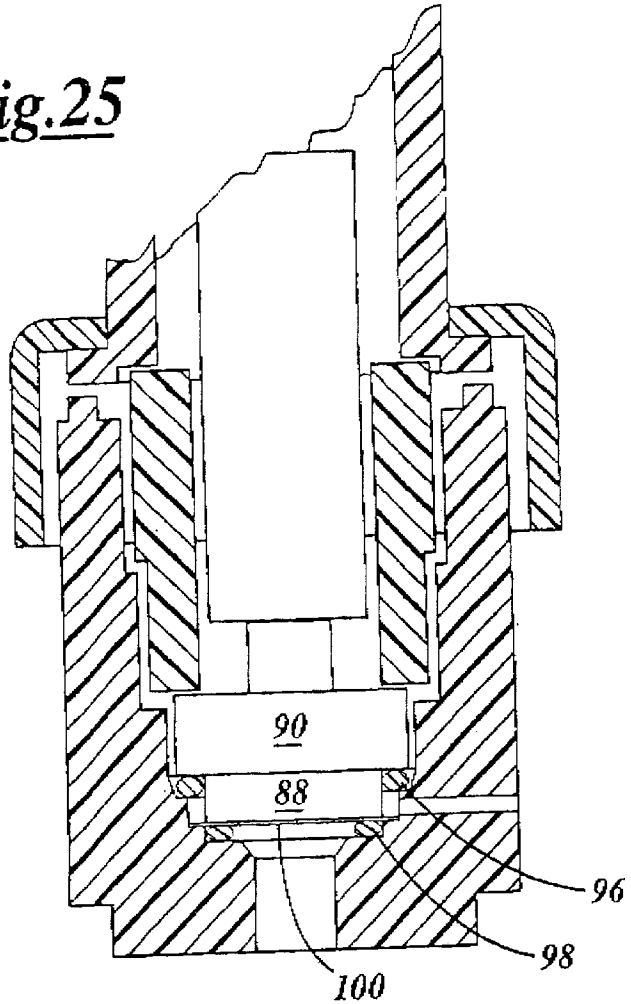
FIG. 25 is a fragmentary partial sectional side elevational view of an alternate embodiment of the pressure transducer module in accordance with the present invention.
Figure 27:
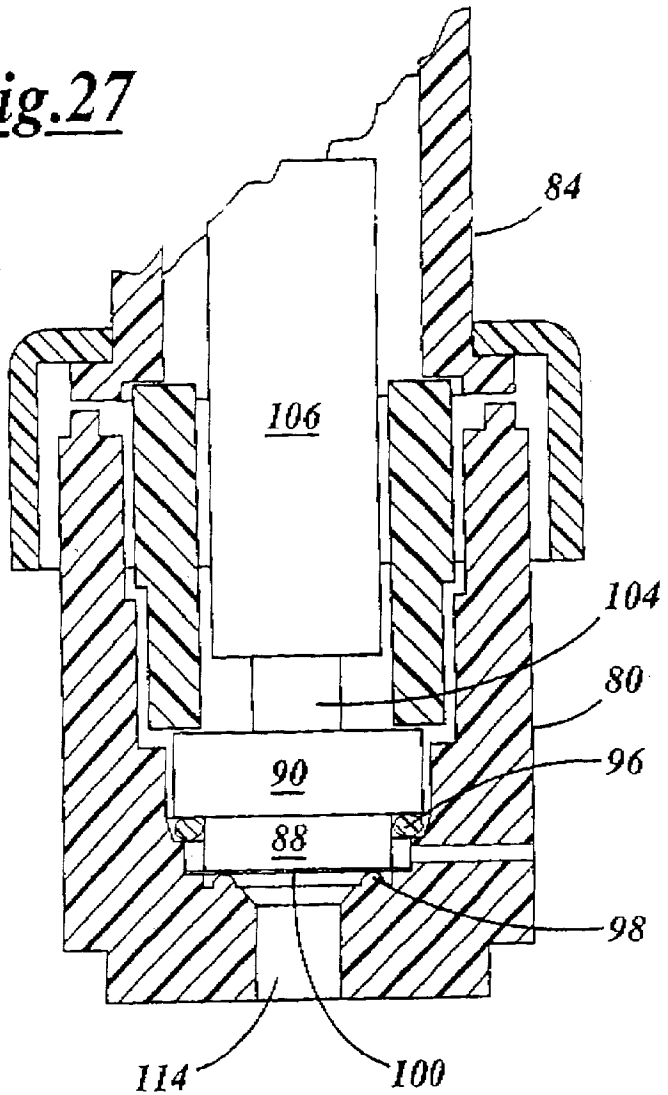
FIG. 27 is a fragmentary partial sectional side elevational view of an alternate embodiment of the pressure transducer module in accordance with the present invention.
Figure 26:
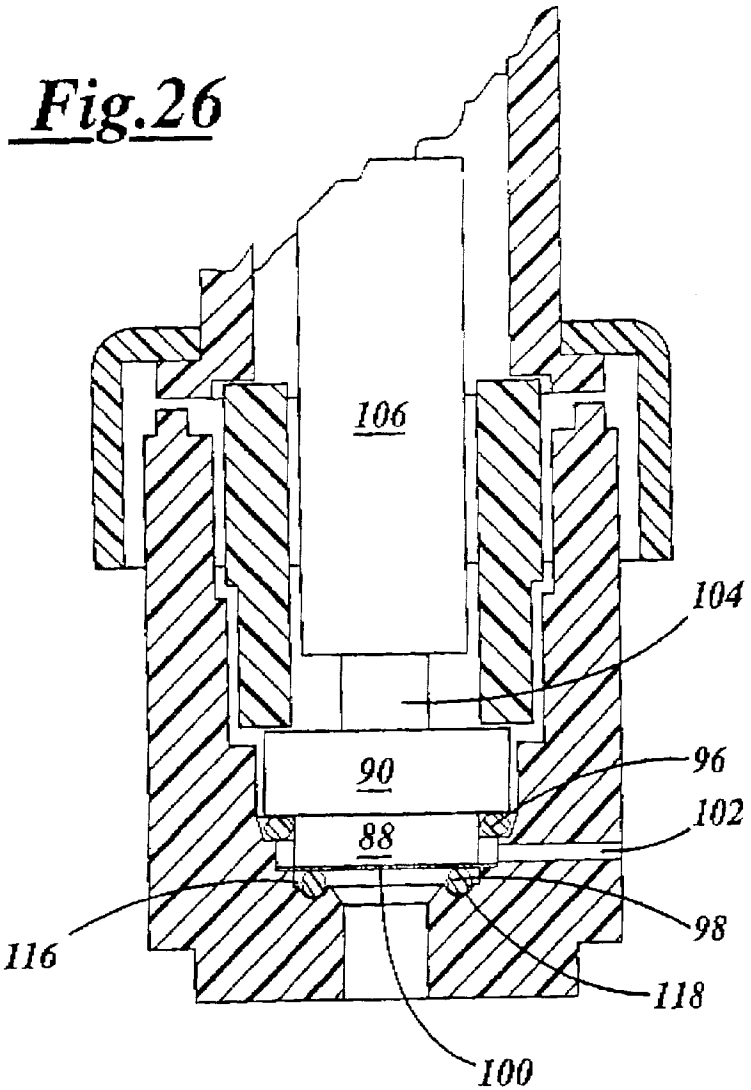
FIG. 26 is a fragmentary partial sectional side elevational view of an alternate embodiment of the pressure transducer module in accordance with the present invention.
Figure 29:
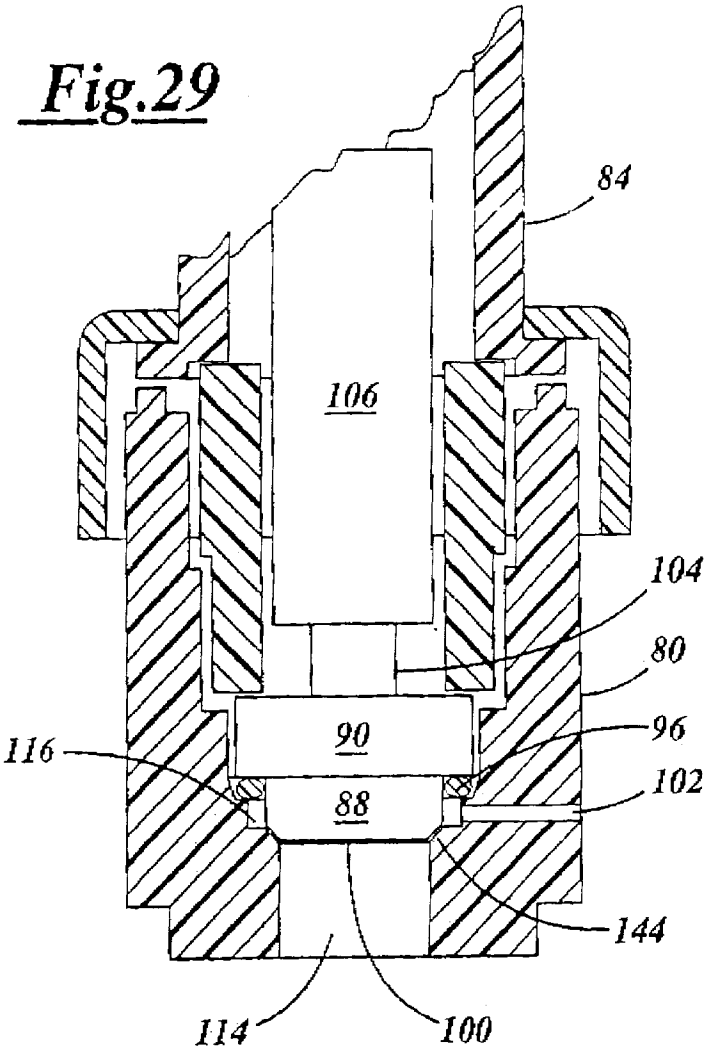
FIG. 29 is a fragmentary partial sectional side elevational view of an alternate embodiment of the pressure transducer module in accordance with the present invention.
Figure 28:
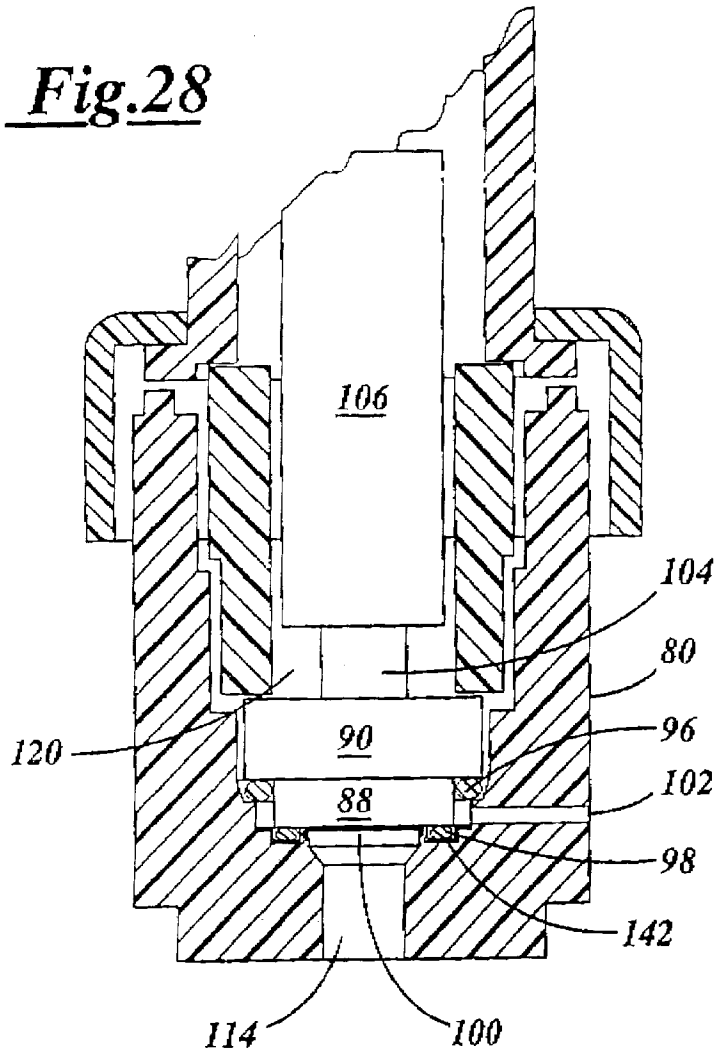
FIG. 28 is a fragmentary partial sectional side elevational view of an alternate embodiment of the pressure transducer module in accordance with the present invention.

FIGS. 25–27 show the isolation member 100 positioned above the sealing member 98. The sealing member 98 may be constructed of an annular elastomer (see FIGS. 25–26) or may be formed directly into the ledge 116 (see FIG. 27). FIG. 28 shows an annular groove 142 formed in the ledge 116. The isolation member conforms to the groove and an elastomer seal is shown positioned above the isolation member adjacent the groove 142. FIG. 29 shows another variation of the sealing member 98, wherein the opening formed by the ledge 116 and the adjacent edge of the sensor 88 are beveled. When the isolation member 100 is sandwiched between the ledge and sensor the beveled edge 144 forms the sealing member 98 therebetween.

Figure 30:
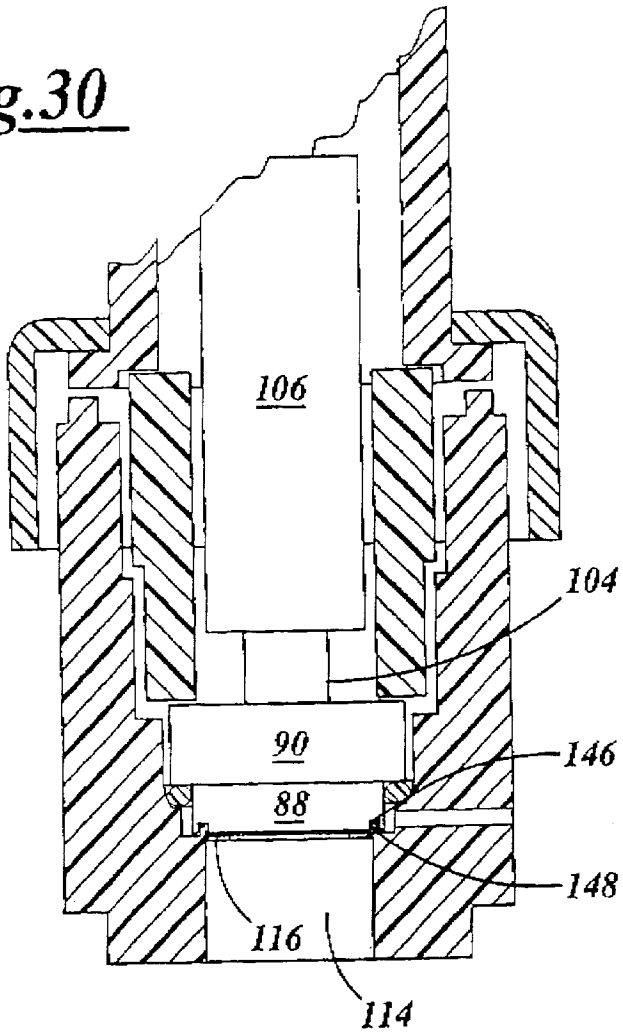
FIG. 30 is a fragmentary partial sectional side elevational view of an alternate embodiment of the pressure transducer module in accordance with the present invention.

FIG. 30 shows yet another preferred embodiment of the pressure sensor. The sensor 88 has an annular groove 146 formed on the lower surface thereof An annular ridge 148 conforming to the shape and size of the annular groove 146 extends up from the ledge 116. When the sensor 88 engages the ledge 116 the ridge 148 engages the groove 142 thereby sealing the lower surface of the sensor to the ledge 116. The lower surface of the sensor 88 may comprise a sapphire layer. Alternatively, an isolation member 100 may be positioned between the sensor 88 and ledge 116, wherein the isolation member is engaged between the groove 146 and ridge 148, thereby forming the sealing member 98.

Having described the constructional features of the present invention the mode of use will now be discussed. The user couples the pressure transducer module 10 into a UHP fluid flow circuit through pressure fittings. As fluid flows through the flow circuit, the pressure distorts the thin ceramic plate of the pressure sensor or as a function thereof, and thus changes the capacitance of the ceramic pressure sensor. The change in capacitance is related to the pressure within the flow circuit. This change in capacitance is detected by the electric circuit which, in turn, produces an analog signal proportional to the pressure. The gauge pressure or absolute pressure may equally be determined.

Those skilled in the art will recognize that the transducer output may be calibrated so that minimum output values are associated with minimum pressure and maximum output pressures are associated with maximum pressure. For example, a transducer intended to measure 0 to 100 psig (pounds per square inch gauge) can be calibrated to read 4 mA (milliamps) at 0 psig and 20 mA at 100 psig.

By providing the various embodiments of the chemically inert isolation member which engages the pressure sensor, the working fluid does not contact the surfaces of the sensor which could lead to contamination. The various sealing arrangements disclosed above insure that the working fluid does not enter the cavity of the housing and adversely affect the electronic circuitry even when the fluid flow conduit and therefore the housing area subjected to high temperatures.

This invention has been described herein in considerable detail in order to comply with the patent statutes and to provide those skilled in the art with the information needed to apply the novel principles and to construct and use such specialized components as are required. However, it is to be understood that the invention can be carried out by specifically different devices, and that various modifications, both as to the equipment details and operating procedures, can be accomplished without departing from the scope of the invention itself.

What is claimed is:

1. A chemically inert pressure transducer module adapted to be connected within a chemically corrosive ultra high purity fluid flow circuit, comprising:

(a) a chemically inert housing having a bore extending through at least a portion of said housing, wherein an inlet end of said bore is connected to the fluid flow circuit, said housing further having a cavity formed therein and extending from an outer surface of said housing toward the bore of said housing;

(b) a non-fluid conducting pressure sensor positioned within said cavity adjacent said bore for sensing a pressure within the fluid flow circuit;

(c) a *removable* chemically inert isolation member separating said cavity and said bore, said isolation member having first and second opposed major surfaces, said first major surface being exposed to fluid flowing in the bore, said second major surface engaging and adjoining the non-fluid conducting pressure sensor, thereby isolating the pressure sensor from fluid communication with the bore; and (d) means for constraining the pressure sensor against the isolation member in a fixed position within the cavity of the housing.

2. The pressure transducer module as recited in claim 1, wherein the housing further has a drain channel extending from the outer surface of the housing into the cavity between first and second sealing members.

[3. The pressure transducer module as recited in claim 1, wherein said isolation member is formed continuous with said housing and has a thickness dimension ranging between 0.001 and 0.040 inches.]

4. The pressure transducer module as recited in claim [3] *1*, wherein the housing further has a drain channel extending from the outer surface of the housing into *a portion of* the cavity *that is* between *the isolation member and* a sealing member which seals the pressure sensor to the housing [and the isolation member].

5. The pressure transducer module as recited in claim 1, wherein an internal surface of the cavity includes first and second sealing members adapted for engaging a lower surface of the pressure sensor.

6. The pressure transducer module as recited in claim 5, wherein the housing further has a drain channel extending from the outer surface of the housing into the cavity between the first and second sealing members.

7. The pressure transducer module as recited in claim 1, wherein the isolation member has a shape congruent with the bore and is sized to fit within the bore.

8. The pressure transducer module as recited in claim 5, wherein the isolation member has a shape congruent with the bore and is sized to fit within the bore.

9. The pressure transducer module as recited in claim 1, wherein the pressure sensor is of a capacitive type.

10. The pressure transducer module as recited in claim 1, wherein the pressure sensor is of a diaphragm type.

11. The pressure transducer module as recited in claim 1, wherein the pressure sensor is of a piezoresistive type.

12. A chemically inert pressure transducer module adapted to be connected within a chemically corrosive ultra high purity fluid flow circuit, comprising:

(a) a chemically inert housing having a bore extending through at least a portion of said housing, wherein an inlet end of said bore is connected to the fluid flow circuit, said housing further having a cavity formed therein and extending from an outer surface of said housing into the bore of said housing;

(b) a non-fluid conducting pressure sensor positioned within said cavity adjacent said bore for sensing a pressure within the fluid flow circuit;

(c) a *removable* chemically inert isolation member separating said cavity and said bore, said isolation member having first and second opposed major surfaces, said first major surface being exposed to fluid flowing in the bore, said second major surface being adjacent to and adjoining the non-fluid conducting pressure sensor, thereby isolating the pressure sensor from fluid communication with the bore;

(d) means for constraining the isolation member against the non-fluid conducting pressure sensor in a fixed position within the cavity of the housing; and (e) an electronic circuit contained within the cavity of the housing and coupled to the non-fluid conducting pressure sensor, whereby the electronic circuit produces an electrical signal proportional to the pressure within the bore.

13. The pressure transducer module as recited in claim 12, wherein the housing further has a drain channel extending from the outer surface of the housing into the cavity between first and second sealing members.

14. The pressure transducer module as recited in claim 12, wherein an internal surface of the cavity includes first and second sealing members adapted for engaging a lower surface of the pressure sensor.

15. The pressure transducer module as recited in claim 14, wherein the housing further has a drain channel extending from the outer surface of the housing into the cavity between the first and second sealing members.

16. The pressure transducer module as recited in claim 12, wherein the isolation member has a shape congruent with the bore and is sized to fit within the bore.

17. The pressure transducer module as recited in claim 14, wherein the isolation member has a shape congruent with the bore and is sized to fit within the bore.

18. The pressure transducer module as recited in claim 12, wherein said pressure sensor includes an annular groove formed on a lower surface of said sensor and being adaptable for receiving a sealing member for sealing said pressure sensor to an internal surface of said housing.

19. A chemically inert pressure transducer module adapted to be connected in-line within a chemically corrosive ultra high purity fluid flow circuit, comprising:

(a) a chemically inert housing having a bore extending through at least a portion of said housing, wherein an inlet end of said bore is connected to the fluid flow circuit, said housing further having a cavity formed therein and extending from an outer surface of said housing toward the bore of said housing;

(b) a non-fluid conducting pressure sensor positioned within said cavity adjacent said bore for sensing a pressure within the fluid flow circuit, said pressure sensor having [an] *a sapphire* isolation member engaged to a lower planar surface of the pressure sensor; and (c) means for sealably constraining the pressure sensor and isolation member against an opening formed in the housing between the cavity and bore.

20. The pressure transducer module as recited in claim 19, wherein the housing further has a drain channel extending from the outer surface of the housing into the cavity between first and second sealing members.

21. The pressure transducer module as recited in claim 19, wherein said isolation member is formed continuous with said housing and has a thickness dimension ranging between 0.001 and 0.040 inches.

22. The pressure transducer module as recited in claim 21, wherein the housing further has a drain channel extending from the outer surface of the housing into the cavity between a sealing member which seals the pressure sensor to the housing and a second sealing member that seals the isolation member to the pressure sensor.

23. The pressure transducer module as recited in claim 19, wherein an internal surface of the cavity includes [a] first and second sealing members adjacent the opening and adapted for engaging a lower surface of the isolation member.

24. The pressure transducer module as recited in claim 23, wherein the housing further has a drain channel extending from the outer surface of the housing into the cavity between the first and second sealing members.

25. The pressure transducer module as recited in claim 23, wherein said isolation member is *instead* constructed of a material selected from the group consisting of PFA, PTFE, FEP, ETFE, CTFE, ECTFE, PVDF, *and* PEEK[, and sapphire].

26. The pressure transducer module as recited in claim 19, wherein the isolation member has a shape congruent with the bore and is sized to fit within the bore.

27. The pressure transducer module as recited in claim 19, wherein said isolation member is formed as part of the housing.

28. The pressure transducer module as recited in claim 19, wherein the isolation member is replaceable and is manufactured from a chemically inert fluoropolymer.

29. The pressure transducer module as recited in claim [27] *19*, wherein said isolation member forms a lower chemically inert layer of the pressure sensor [and further includes an annular groove formed in the lower planar surface of the pressure sensor].

30. The pressure transducer module as recited in claim 19, wherein an edge proximate the lower planar surface of the pressure sensor is beveled.

31. The pressure transducer module as recited in claim 20, further including a fluid sensor positioned proximate the drain channel for detecting the presence of fluids within the drain channel.

32. A chemically inert pressure transducer module adapted to be connected within a chemically corrosive ultra high purity fluid flow circuit, comprising:

(a) a housing having a bore extending through at least a portion of said housing, wherein an inlet end of said bore is connected to a fluid flow circuit, said housing further having a cavity formed therein and extending from an outer surface of said housing toward the bore of said housing;

(b) a non-fluid conducting pressure sensor positioned within said cavity adjacent said bore for sensing a pressure within the fluid flow circuit;

(c) an *removable* isolation member separating said cavity and said bore, said isolation member having first and second opposed major surfaces, said first major surface being exposed to fluid flowing in the bore, said second major surface engaging and adjoining the pressure sensor, thereby isolating the pressure sensor from fluid communication with the bore; and (d) means for positioning at least a portion of said pressure sensor and said isolation member in a fixed position within the cavity of the housing.

33. The pressure transducer module as recited in claim 32, wherein the housing further has a drain channel extending from the outer surface of the housing into the cavity between first and second sealing members.

[34. The pressure transducer module as recited in claim 32, wherein said isolation member is formed continuous with said housing.]

35. The pressure transducer module as recited in claim [34] *32*, wherein the housing further has a drain channel extending from the outer surface of the housing into the cavity.

36. The pressure transducer module as recited in claim 32, wherein the pressure sensor is of a capacitive type.

37. The pressure transducer module as recited in claim 32, wherein the pressure sensor is of a diaphragm type.

38. The pressure transducer module as recited in claim 32, wherein the pressure sensor is of a piezoresistive type.

39. The pressure transducer module as recited in claim 32, wherein the pressure sensor is of a sapphire diaphragm type.

[40. The pressure transducer module as recited in claim 32, wherein the isolation member is removable.]

41. The pressure transducer module as recited in claim [40] *32*, wherein the housing further has a drain channel extending from the outer surface of the housing into the cavity between a sealing member which seals the pressure sensor to the housing and a second sealing member that seals the isolation member to the pressure sensor.

42. The pressure transducer module as recited in claim [40] *32*, wherein said isolation member is constructed from a material selected from the group consisting of PFA, PTFE, FEP, ETFE, CTFE, ECTFE, PVDF, PEEK, and sapphire.

43. The pressure transducer module as recited in claim 32, wherein said isolation member is formed as a lower layer of the pressure sensor.

44. The pressure transducer module as recited in claim 43, wherein said isolation member is constructed of sapphire.

45. The pressure transducer module as recited in claim [32] *41*, further including a fluid sensor positioned proximate the drain channel for detecting the presence of fluids within the drain channel.

*46. A chemically inert pressure transducer module adapted to be connected within a corrosive fluid flow circuit, said pressure transducer module comprising:*

*(a) a housing having an inlet suitable for coupling to a fluid flow circuit;*

*(b) a non-fluid conducting pressure sensor contained within said housing and isolated from the fluid flow circuit;*

*(c) a vent extending from an outer surface of said housing into a first chamber of the housing between first and second sealing members, wherein at least a bottom portion of said pressure sensor is sealed within said first chamber and an electrical circuit coupled to said pressure sensor is contained within a second chamber of said housing; and*

*(d) an isolation member isolates the pressure sensor within the housing from the fluid flow circuit, an internal surface of the housing including the first and second sealing members that seal the isolation member to said housing.*

*47. The pressure transducer module as recited in claim 46, wherein the housing further has a second vent extending from the outer surface of the housing into said second chamber.*

*48. The pressure transducer module as recited in claim 46 wherein said isolation member is formed continuous with said housing and has a thickness dimension ranging between 0.001 and 0.040 inches.*

*49. The pressure transducer module as recited in claim 46, wherein said isolation member is constructed from the group consisting of PFA, PTFE, FEP, ETFE, CTFE, ECTFE, PVDF, PEEK, and sapphire.*

*50. The pressure transducer module as recited in claim 46, wherein the isolation member has a shape congruent with the inlet and is sized to fit within the inlet.*

*51. The pressure transducer module as recited in claim 46, wherein the isolation member is removable.*

*52. The pressure transducer module as recited in claim 46, wherein said isolation member forms a lower layer of the pressure sensor.*

* * * * *